US010620779B2

(12) United States Patent
Hastings et al.

(10) Patent No.: US 10,620,779 B2
(45) Date of Patent: Apr. 14, 2020

(54) NAVIGATING A HOLOGRAPHIC IMAGE

(71) Applicant: Microsoft Technology Licensing, LLC, Redmond, WA (US)

(72) Inventors: Ryan L. Hastings, Seattle, WA (US); Jason B. Scott, Newcastle, WA (US); Jonathan G. Paulovich, Redmond, WA (US); Jedd Chevrier, Redmond, WA (US); David A. Evans, Kirkland, WA (US); Karim A. Luccin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 15/494,655

(22) Filed: Apr. 24, 2017

(65) Prior Publication Data

US 2018/0307397 A1 Oct. 25, 2018

(51) Int. Cl.
| | | |
|---|---|---|
| *G06F 3/0481* | (2013.01) | |
| *G06F 3/0484* | (2013.01) | |
| *G06F 3/0485* | (2013.01) | |
| *G06F 3/01* | (2006.01) | |
| *G02B 27/01* | (2006.01) | |

(52) U.S. Cl.
CPC ..... *G06F 3/04815* (2013.01); *G02B 27/0172* (2013.01); *G06F 3/011* (2013.01); *G06F 3/012* (2013.01); *G06F 3/017* (2013.01); *G06F 3/0484* (2013.01); *G06F 3/0485* (2013.01); *G06F 3/04845* (2013.01); *G02B 2027/0174* (2013.01); *G06F 2203/04806* (2013.01)

(58) Field of Classification Search
CPC ............... G06F 3/04815; G06F 3/0485; G06F 3/04845; G06F 3/017; G06F 3/011; G02B 27/0172
See application file for complete search history.

(56) References Cited

U.S. PATENT DOCUMENTS

| | | | | |
|---|---|---|---|---|
| 8,467,133 | B2 * | 6/2013 | Miller | G02B 27/017 |
| | | | | 353/28 |
| 8,665,272 | B2 | 3/2014 | Fitzmaurice et al. | |
| 8,988,344 | B2 | 3/2015 | Venable et al. | |
| 9,213,403 | B1 | 12/2015 | Raffle et al. | |
| 9,377,865 | B2 | 6/2016 | Berenson et al. | |
| 9,651,782 | B2 * | 5/2017 | Lundberg | G06K 9/48 |

(Continued)

FOREIGN PATENT DOCUMENTS

WO  2011106008 A1  9/2011

OTHER PUBLICATIONS

Adhikarla, et al., "Freehand interaction with large-scale 3D map data", in Proceedings of 3DTV-Conference: The True Vision—Capture, Transmission and Display of 3D Video (3DTV-CON), Jul. 2, 2014, 6 pages.

(Continued)

*Primary Examiner* — Daeho D Song
(74) *Attorney, Agent, or Firm* — Arent Fox LLP

(57) ABSTRACT

Technology is proposed to enable navigating a holographic image. A moving object, such as a hand, is tracked and a gesture is recognized. In response to recognizing the gesture, a virtual shape is created at the location of the recognized gesture. The shape has at least one dimension. The holographic image is moved based on current position of the moving object with respect to the virtual shape.

15 Claims, 17 Drawing Sheets

(56) References Cited

U.S. PATENT DOCUMENTS

| | | | |
|---|---|---|---|
| 9,728,006 B2* | 8/2017 | Varga | G06T 19/006 |
| 9,767,613 B1* | 9/2017 | Bedikian | G06T 19/006 |
| 10,021,297 B2* | 7/2018 | Kwon | G06F 3/017 |
| 10,102,676 B2* | 10/2018 | Yajima | G06K 9/00355 |
| 2008/0288895 A1* | 11/2008 | Hollemans | G06F 3/041 |
| | | | 715/863 |
| 2009/0228841 A1 | 9/2009 | Hildreth | |
| 2010/0199232 A1 | 8/2010 | Mistry et al. | |
| 2012/0069131 A1* | 3/2012 | Abelow | G06Q 10/067 |
| | | | 348/14.01 |
| 2012/0327125 A1* | 12/2012 | Kutliroff | G06F 3/017 |
| | | | 345/660 |
| 2013/0265220 A1* | 10/2013 | Fleischmann | G06F 3/011 |
| | | | 345/156 |
| 2013/0321462 A1* | 12/2013 | Salter | G06F 1/163 |
| | | | 345/633 |
| 2013/0328925 A1* | 12/2013 | Latta | G09G 3/003 |
| | | | 345/633 |
| 2014/0129976 A1 | 5/2014 | Beaurepaire et al. | |
| 2014/0191998 A1* | 7/2014 | Chuang | G06F 3/017 |
| | | | 345/173 |
| 2014/0225918 A1 | 8/2014 | Mittal et al. | |
| 2014/0267400 A1 | 9/2014 | Mabbutt et al. | |
| 2014/0320408 A1* | 10/2014 | Zagorsek | G06F 3/017 |
| | | | 345/158 |
| 2014/0361988 A1* | 12/2014 | Katz | G06F 3/011 |
| | | | 345/156 |
| 2015/0042640 A1* | 2/2015 | Algreatly | G06T 3/005 |
| | | | 345/419 |
| 2015/0061998 A1* | 3/2015 | Yang | G06F 3/04815 |
| | | | 345/156 |
| 2015/0116213 A1 | 4/2015 | Bondan et al. | |
| 2015/0153912 A1* | 6/2015 | Reily | A45C 11/00 |
| | | | 715/784 |
| 2015/0244747 A1* | 8/2015 | Wickenkamp | G06F 3/0482 |
| | | | 726/28 |
| 2015/0309629 A1 | 10/2015 | Amariutei et al. | |
| 2015/0338915 A1* | 11/2015 | Publicover | G06F 21/64 |
| | | | 345/633 |
| 2015/0346506 A1* | 12/2015 | Huang | G02B 27/4205 |
| | | | 359/567 |
| 2015/0346813 A1 | 12/2015 | Vargas et al. | |
| 2016/0026253 A1* | 1/2016 | Bradski | G02B 27/225 |
| | | | 345/8 |
| 2016/0109851 A1* | 4/2016 | Tsang | G03H 1/0866 |
| | | | 359/9 |
| 2016/0109957 A1* | 4/2016 | Takashima | G06F 1/163 |
| | | | 345/8 |
| 2016/0195849 A1* | 7/2016 | Takagi | G03H 1/2249 |
| | | | 348/40 |
| 2016/0239181 A1 | 8/2016 | You et al. | |
| 2016/0284136 A1* | 9/2016 | Johnston | G06T 19/006 |
| 2016/0306431 A1* | 10/2016 | Stafford | G02B 27/0172 |
| 2017/0068323 A1* | 3/2017 | West | G06F 3/017 |
| 2017/0371410 A1* | 12/2017 | Boss | G06F 3/014 |
| 2018/0004283 A1* | 1/2018 | Mathey-Owens | G06F 3/04815 |
| 2018/0239511 A1* | 8/2018 | No | G06F 3/0488 |

OTHER PUBLICATIONS

"International Search Report and Written Opinion Issued in PCT Application No. PCT/US18/026382", dated Aug. 17, 2018, 17 Pages.

* cited by examiner

NAVIGATING A HOLOGRAPHIC IMAGE

BACKGROUND

Navigating an image on a computer has an established user experience. For example, a map can be provided on a display and the user can manipulate a mouse or touch the screen to slide or zoom the map. However, when the image is a holographic image, navigation become more complicated because the user likely does not have access to a mouse or keyboard. Even if the user did have access to a mouse and keyboard, navigating a holographic image with a mouse is not intuitive.

SUMMARY

Embodiments of the present technology relate to a system and method for navigating a holographic image. A moving object (e.g., a hand) is tracked and a gesture is recognized. In response to recognizing the gesture, a virtual shape is created at the location of the recognized gesture. The holographic image is moved based on current position of the moving object with respect to the virtual shape. This system can also be used to navigate images that are not holographic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments of the present technology will now be described with reference to the figures, which in general relate to a system and method for navigating a holographic image.

Various systems can be used to implement the technology for navigating a holographic image. On embodiment uses a head mounted display device that includes a display element which is to a degree transparent so that a user can look through the display element at real world objects within the user's field of view (FOV). Thus, the head mounted display device can also be referred to as a see-through head mounted display device. The display element also provides the ability to project holographic images into the FOV of the user such that the holographic images may also appear alongside the real world objects. The system automatically tracks where the user is looking so that the system can determine where to insert a holographic image in the FOV of the user. Once the system knows where to project the holographic image, the image is projected using the display element. The holographic image is a virtual image because it does not actually exists in the real world. Rather, the head mounted display device projects the virtual image so that the user can see it. Because the user can see real world objects within the user's FOV and virtual images, the head mounted display device provides a mixed reality experience.

In embodiments, the processor may build a model of the environment including the x, y, z Cartesian positions of one or more users, real world objects and holographic three-dimensional objects. Where there are multiple users viewing the same holographic objects, the positions of each head mounted display device may be calibrated to the model of the environment. This allows the system to determine each user's line of sight and FOV of the environment. Thus, a holographic image may be displayed to each user, but the system determines the display of the holographic image from each user's perspective, adjusting the holographic image for parallax and any occlusions of or by other objects in the environment. The three-dimensional model of the environment, referred to herein as a scene map, as well as all tracking of each user's FOV and objects in the environment may be generated by a mobile processing unit by itself, or working in tandem with other processing devices as explained hereinafter.

Figure 1:
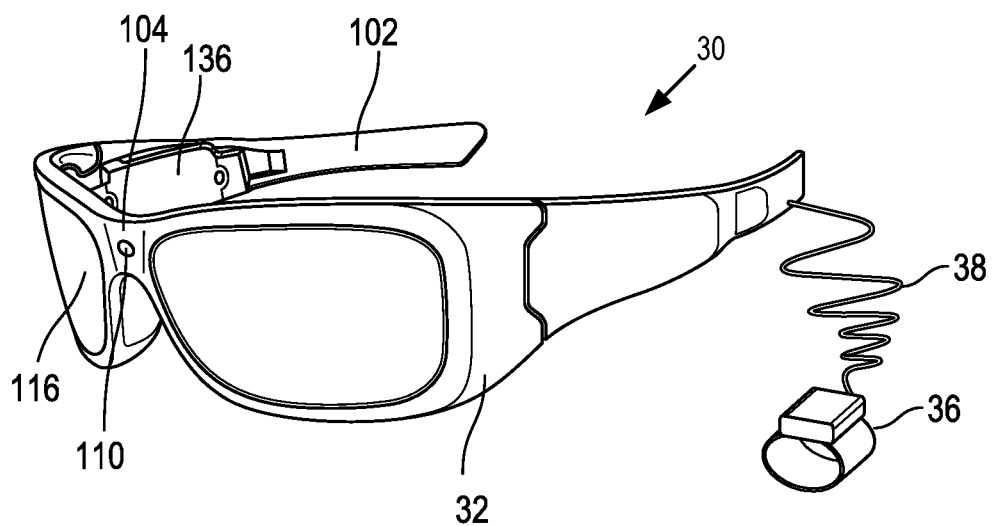
FIG. 1 is a perspective view of one embodiment of a head mounted display device.

FIG. 1 illustrates a mobile processing device 30 including a head mounted display device 32 which may include or be in communication with its own processing unit 36, for example via a flexible wire 38. The head mounted display device may alternatively communicate wirelessly with the processing unit 36. In further embodiments, the processing unit 36 may be integrated into the head mounted display device 32. Head mounted display device 32, which in one embodiment is in the shape of glasses (or goggles), is worn on the head of a user so that the user can see-through a display and thereby have an actual direct view of the space in front of the user. More details of the head mounted display device 32 and processing unit 36 are provided below.

Where not incorporated into the head mounted display device 32, the processing unit 36 may be a small, portable device for example worn on the user's wrist or stored within a user's pocket (or elsewhere). The processing unit 36 may include hardware components and/or software components to execute applications such as generation and manipulation of holographic images according to embodiments of the present technology explained below. In one embodiment, processing unit 36 may include a processor such as a standardized processor, a specialized processor, a microprocessor, or the like that may execute instructions stored on a processor readable storage device for performing the processes described herein. In embodiments, the processing unit 36 may communicate wirelessly (e.g., WiFi, Bluetooth, infra-red, or other wireless communication means) with one or more remote computing systems. These remote computing systems may include a computer or a remote service provider. In further embodiments, the processing unit 36 may be a mobile phone or other cellular device, or the processing unit may have a wired or wireless connection to a mobile cellular device.

The head mounted display device 32 and processing unit 36 of the mobile processing device 30 may cooperate with each other to present holographic objects to a user in a mixed reality environment 10. The details of the head mounted display device 32 and processing unit 36 which enable the display of holographic plants that grow over time will now be explained with reference to FIGS. 2-5.

Figure 2:
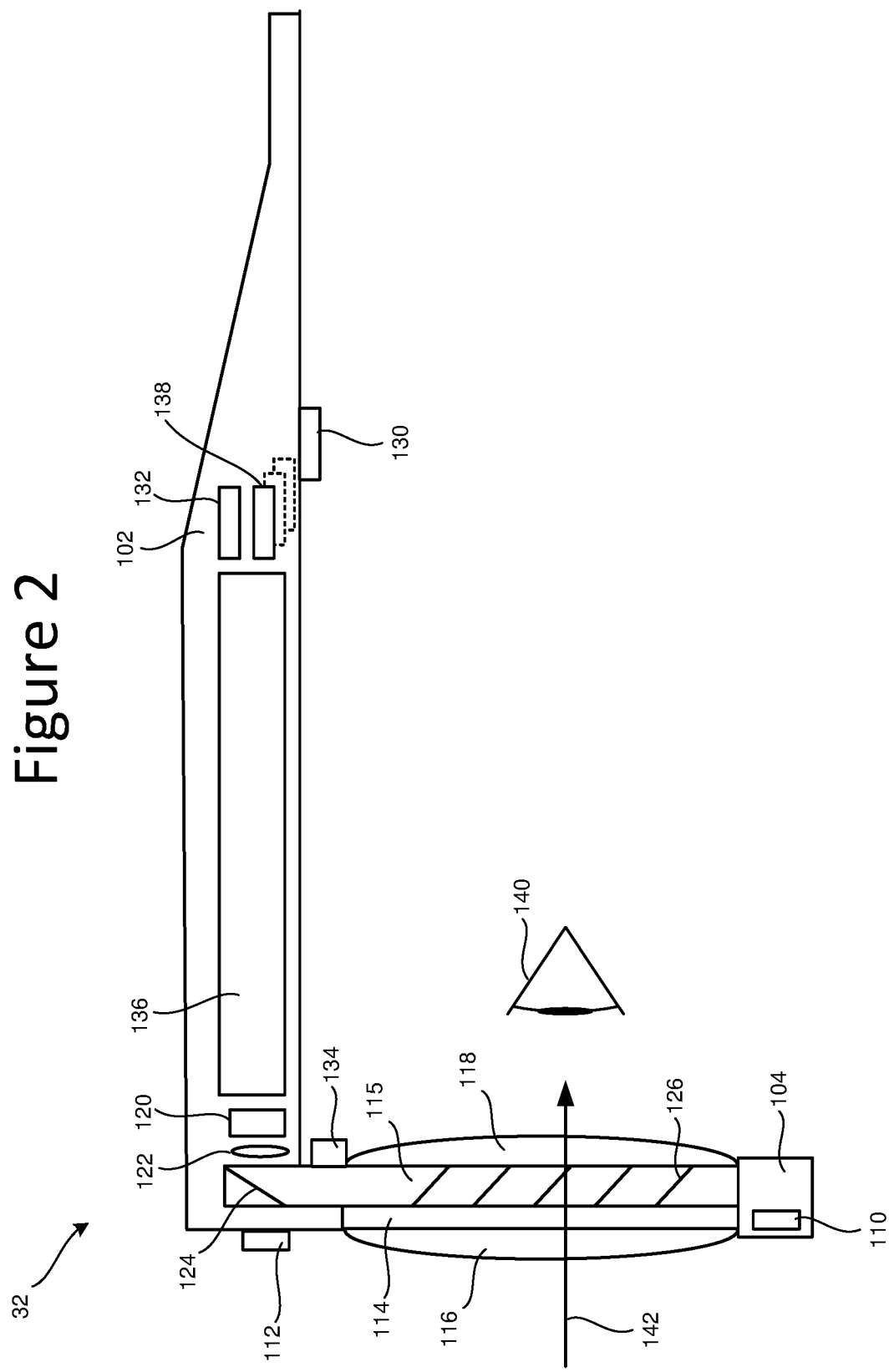
FIG. 2 is a side view of a portion of one embodiment of the head mounted display device.

FIG. 2 shows only the right side of head mounted display device 32, including a portion of the device having temple 102 and nose bridge 104. Built into nose bridge 104 is a microphone 110 for recording sounds and transmitting that audio data to processing unit 36, as described below. At the front of head mounted display device 32 is forward-facing video camera 112 that can capture video and still images. Those images are transmitted to processing unit 36, as described below. While a particular configuration is shown, it is understood that the position of the various components and sensors within the head mounted display device 32 may vary.

A portion of the frame of head mounted display device 32 will surround a display (that includes one or more lenses). In order to show the components of head mounted display device 32, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a holographic image, and lens 122 for directing images from microdisplay 120 into light-guide optical element 115. In one embodiment, lens 122 is a collimating lens.

Control circuits 136 may be provided within the head mounted display device 32 for supporting various components of head mounted display device 32. More details of control circuits 136 are provided below with respect to FIG. 3. Inside or mounted to temple 102 are ear phones 130 and inertial measurement unit 132. In one embodiment shown in FIG. 3, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 32. The IMU 132 may include other inertial sensors in addition to or instead of magnetometer 132A, gyro 132B and accelerometer 132C.

The head mounted display device 32 may further include one or more environmental sensors 138. The environmental sensors may include a temperature sensor, a humidity sensor, an atmospheric pressure sensor, a rain sensor, an air quality sensor and/or an airborne particulate sensor. The configuration of these sensors may be known in the art. It is understood that the environmental sensors 138 may include other or additional sensors for sensing environmental parameters. As explained below, the feedback from the one or more environmental sensors may be used by the processing unit to determine rate of growth of the holographic plants displayed to a user.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 32. Light-guide optical element 115 also allows light from in front of the head mounted display device 32 to be transmitted through light-guide optical element 115 to eye 140, as depicted by arrow 142, thereby allowing the user to have an actual direct view of the space in front of head mounted display device 32 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which reflecting surface 126 is engineered by selecting an appropriate angle of the reflecting surfaces 126. More details of a light-guide optical element can be found in United States Patent Publication No. 2008/0285140, entitled "Substrate-Guided Optical Devices," published on Nov. 20, 2008. In one embodiment, each eye will have its own light-guide optical element 115. When the head mounted display device 32 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an example of opacity filter 114 are provided in U.S. Patent Publication No. 2012/0068913 to Bar-Zeev et al., entitled "Opacity Filter For See-Through Mounted Display," filed on Sep. 21, 2010. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel.

Figure 3:
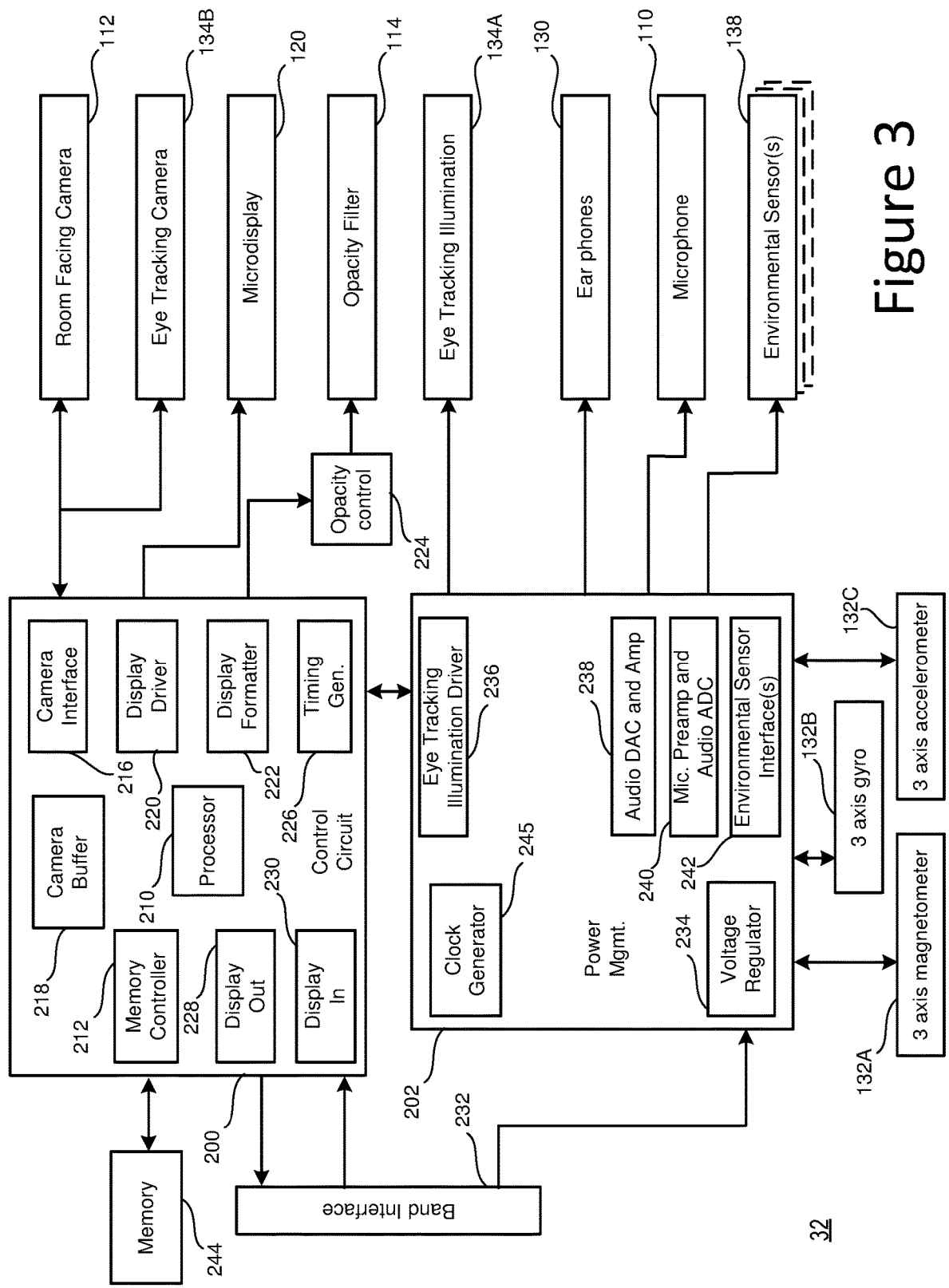
FIG. 3 is a block diagram of one embodiment of the components of the head mounted display device.

Head mounted display device 32 also includes a system for tracking the position of the user's eyes. The system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 32 includes eye tracking assembly 134, which has an eye tracking illumination device 134A and eye tracking camera 134B (FIG. 3). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

FIG. 2 only shows half of the head mounted display device 32. A full head mounted display device may include another set of see-through lenses, another opacity filter, another light-guide optical element, another microdisplay 120, another lens 122, another forward-facing camera, another eye tracking assembly 134, earphones, and one or more additional environmental sensors.

Figure 4:
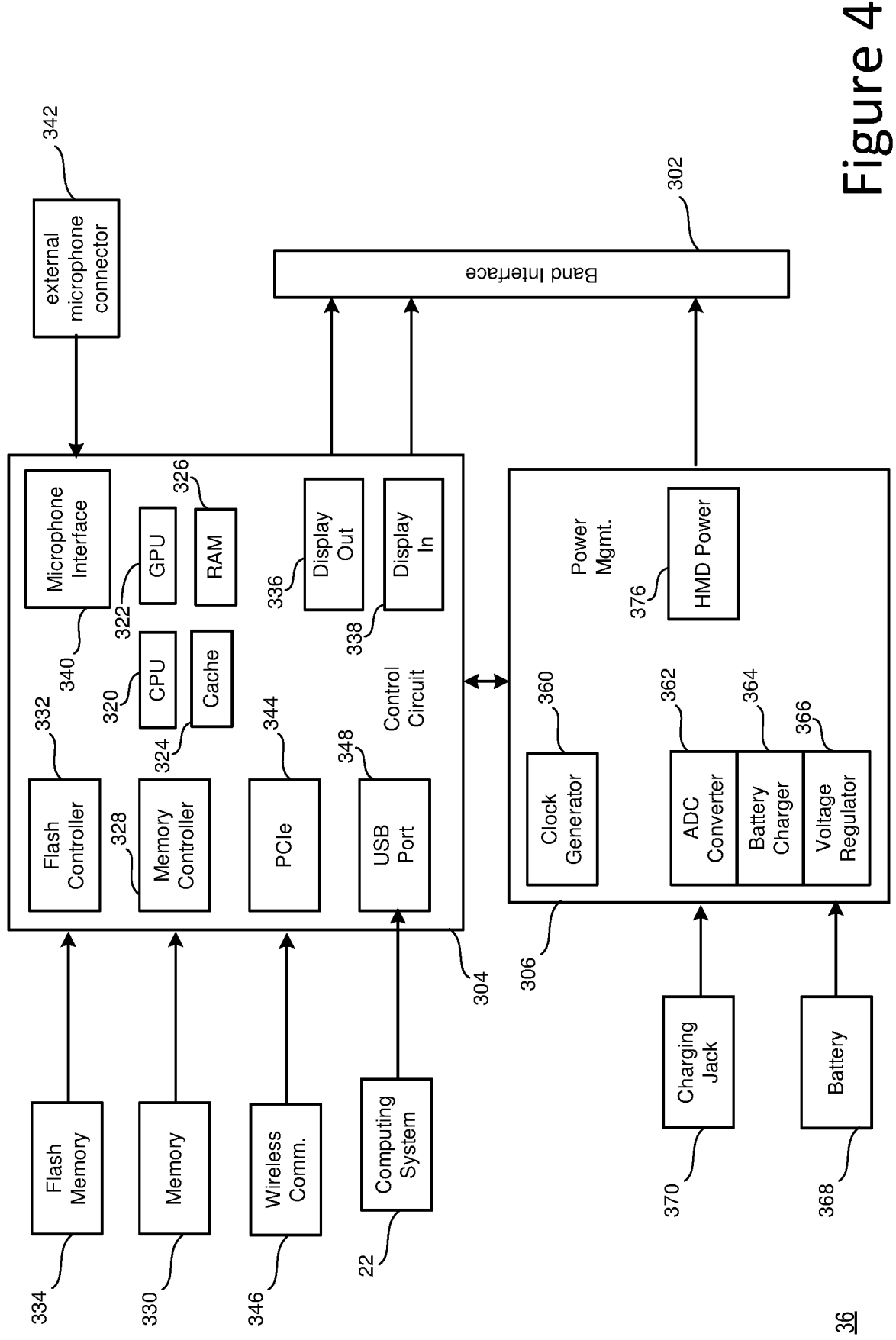
FIG. 4 is a block diagram of one embodiment of the components of a processing unit associated with the head mounted display device.

FIG. 3 is a block diagram depicting the various components of head mounted display device 32. FIG. 4 is a block diagram describing the various components of processing unit 36. Head mounted display device 32, the components of which are depicted in FIG. 3, is used to provide a virtual experience to the user by fusing one or more virtual images seamlessly with the user's view of the real world. Additionally, the head mounted display device components of FIG. 3 include many sensors that track various conditions. Head mounted display device 32 will receive instructions about the virtual image from processing unit 36 and will provide the sensor information back to processing unit 36. Processing unit 36 may determine where and when to provide a virtual image to the user and send instructions accordingly to the head mounted display device of FIG. 3.

Some of the components of FIG. 3 (e.g., forward-facing camera 112, eye tracking camera 134B, microdisplay 120, opacity filter 114, eye tracking illumination 134A) are shown in shadow to indicate that there may be two of each of those devices, one for the left side and one for the right side of head mounted display device 32. FIG. 3 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, the components of control circuit 200 are in communication with each other via dedicated lines or one or more buses. In another embodiment, the components of control circuit 200 are in communication with processor 210. Camera interface 216 provides an interface to the two forward-facing cameras 112 and stores images received from the forward-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from forward-facing cameras 112 to the processing unit 36. Display in interface 230 is a buffer for receiving images such as a virtual image to be displayed on microdisplay 120. Display out interface 228 and display in interface 230 communicate with band interface 232 which is an interface to processing unit 36.

Power management circuit 202 includes voltage regulator 234, eye tracking illumination driver 236, audio DAC and amplifier 238, microphone preamplifier and audio ADC 240, environmental sensor interface(s) 242 and clock generator 245. Voltage regulator 234 receives power from processing unit 36 via band interface 232 and provides that power to the other components of head mounted display device 32. Eye tracking illumination driver 236 provides the IR light source for eye tracking illumination 134A, as described above. Audio DAC and amplifier 238 output audio information to the earphones 130. Microphone preamplifier and audio ADC 240 provide an interface for microphone 110. Environmental sensor interface 242 comprises one or more interfaces adapted to receive input from respective ones of the one or more environmental sensors 138. Power management circuit 202 also provides power and receives data back from three axis magnetometer 132A, three axis gyro 132B and three axis accelerometer 132C.

FIG. 4 is a block diagram describing the various components of processing unit 36. FIG. 4 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of nonvolatile storage), display out buffer 336 in communication with head mounted display device 32 via band interface 302 and band interface 232, display in buffer 338 in communication with head mounted display device 32 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Bluetooth communication device, infrared communication device, etc. The USB port can be used to dock the processing unit 36 to processing unit computing system 22 in order to load data or software onto processing unit 36, as well as charge processing unit 36. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366 and head mounted display power source 376. Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 32. As indicated, the components of the processing unit 36 shown in FIG. 4 may be integrated into the head mounted display device 32.

FIGS. 3 and 4 provide one set of examples of one or more non-transitory processor readable storage devices storing processor readable code for programming a processor to perform a method for navigating a holographic map, as described below.

Figure 5:
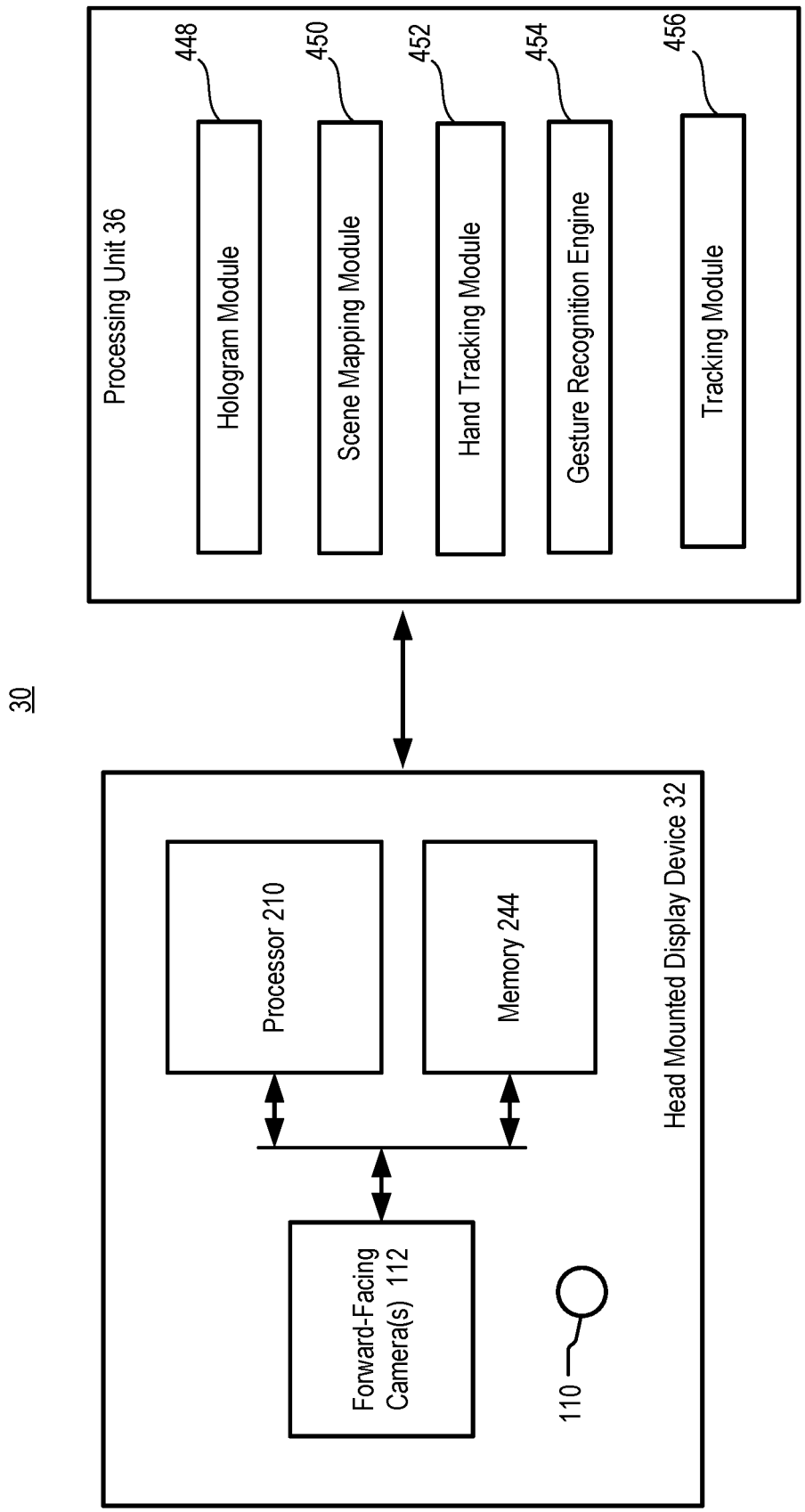
FIG. 5 is a block diagram of one embodiment of the software components of a processing unit associated with the head mounted display device.

FIG. 5 illustrates a high-level block diagram of the mobile processing device 30 including the forward-facing camera 112 of the display device 32 and some of the software modules on the processing unit 36. As noted, at least portions of the processing unit 36 may be integrated into the head mounted display device 32, so that some or all of the software modules shown may be implemented on a processor 210 of the head mounted display device 32. As shown, the forward-facing camera 112 provides image data to the processor 210 in the head mounted display device 32. In one embodiment, the forward-facing camera 112 may include a depth camera, an RGB camera and/or an IR light component to capture image data of a scene. As explained below, the forward-facing camera 112 may include less than all of these components.

Using for example time-of-flight analysis, the IR light component may emit an infrared light onto the scene and may then use sensors (not shown) to detect the backscattered light from the surface of one or more objects in the scene using, for example, the depth camera and/or the RGB camera. In some embodiments, pulsed infrared light may be used such that the time between an outgoing light pulse and a corresponding incoming light pulse may be measured and used to determine a physical distance from the forward-facing camera 112 to a particular location on the objects in the scene, including for example a user's hands. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the forward-facing camera 112 to a particular location on the objects by analyzing the intensity of the reflected beam of light over time via various techniques including, for example, shuttered light pulse imaging.

In another example embodiment, the forward-facing camera 112 may use a structured light to capture depth information. In such an analysis, patterned light (i.e., light displayed as a known pattern such as a grid pattern, a stripe pattern, or different pattern) may be projected onto the scene via, for example, the IR light component. Upon striking the surface of one or more targets or objects in the scene, the pattern may become deformed in response. Such a deformation of the pattern may be captured by, for example, the 3-D camera and/or the RGB camera (and/or other sensor) and may then be analyzed to determine a physical distance from the forward-facing camera 112 to a particular location on the objects. In some implementations, the IR light component is displaced from the depth and/or RGB cameras so triangulation can be used to determined distance from depth and/or RGB cameras. In some implementations, the forward-facing camera 112 may include a dedicated IR sensor to sense the IR light, or a sensor with an IR filter.

It is understood that the present technology may sense objects and three-dimensional positions of the objects without each of a depth camera, RGB camera and IR light component. In embodiments, the forward-facing camera 112 may for example work with just a standard image camera (RGB or black and white). Such embodiments may operate by a variety of image tracking techniques used individually or in combination. For example, a single, standard image forward-facing camera 112 may use feature identification and tracking. That is, using the image data from the standard camera, it is possible to extract interesting regions, or features, of the scene. By looking for those same features over a period of time, information for the objects may be determined in three-dimensional space.

In embodiments, the head mounted display device 32 may include two spaced apart standard image forward-facing cameras 112. In this instance, depth to objects in the scene may be determined by the stereo effect of the two cameras. Each camera can image some overlapping set of features, and depth can be computed from the parallax difference in their views.

A further method for determining a scene map with positional information within an unknown environment is simultaneous localization and mapping (SLAM). One example of SLAM is disclosed in U.S. Pat. No. 7,774,158, entitled "Systems and Methods for Landmark Generation for Visual Simultaneous Localization and Mapping." Additionally, data from the IMU can be used to interpret visual tracking data more accurately.

In accordance with the present technology, the processing unit 36 may implement a hologram module 448, which generates and manipulates (e.g., including panning and zooming) holographic images. Processing unit 36 also include a scene mapping module 450. Using the data from the front-facing camera(s) 112 as described above, the scene mapping module is able to map objects in the scene to the scene map which is a three-dimensional frame of reference. The scene map may map objects such as one or both of the user's hands and other real world objects.

In embodiments noted above, a user may provide input as to where to place holographic objects and how to size them. In one embodiment, the processing unit 36 may execute a hand recognition and tracking module 452 to facilitate this user input. Hand recognition and tracking module 452 receives the image data from the forward-facing camera 112 and is able to identify a user's hand, and a position of the user's hand, in the FOV. An example of the hand recognition and tracking module 452 is disclosed in U.S. Patent Publication No. 2012/0308140, entitled, "System for Recognizing an Open or Closed Hand." In general the module 452 may examine the image data to discern width and length of objects which may be fingers, spaces between fingers and valleys where fingers come together so as to identify and track a user's hands in their various positions. With this information, the mobile processing device 30 is able to detect where a user is placing the user's hands.

The processing unit 36 may further include a gesture recognition engine 454 for receiving skeletal model and/or hand data for one or more users in the scene and determining whether the user is performing a predefined gesture or application-control movement affecting an application running on the processing unit 36. More information about gesture recognition engine 454 can be found in U.S. patent application Ser. No. 12/422,661, entitled "Gesture Recognizer System Architecture," filed on Apr. 13, 2009.

In one example embodiment, the head mounted display device 32 and processing unit 36 work together to create the scene map or model of the environment that the user is in and tracks various moving or stationary objects in that environment. In addition, the processing unit 36 tracks the FOV of the head mounted display device 32 worn by the user 18 by tracking the position and orientation of the head mounted display device 32. Sensor information, for example from the forward-facing cameras 112 and IMU 132, obtained by head mounted display device 32 is transmitted to processing unit 36. The processing unit 36 processes the data and updates the scene model. The processing unit 36 further provides instructions to head mounted display device 32 on where, when and how to insert and move holographic, three-dimensional images.

In some embodiments, a user wearing head mounted display device 32 may be holding or controlling a moving object. For example, the user may be holding a wand or controlling a drone aircraft. In these embodiments, tracking module 456 can be configured to track the moving object in order to continuously determine and record the location and orientation of the moving object. Gesture Recognition Engine 454 can also be used to identify gestures performed by a moving object other than a hand. For example, a drone aircraft can perform a maneuver as a gesture or a wand can be moved in a predetermined manner as a gesture.

Figure 6:
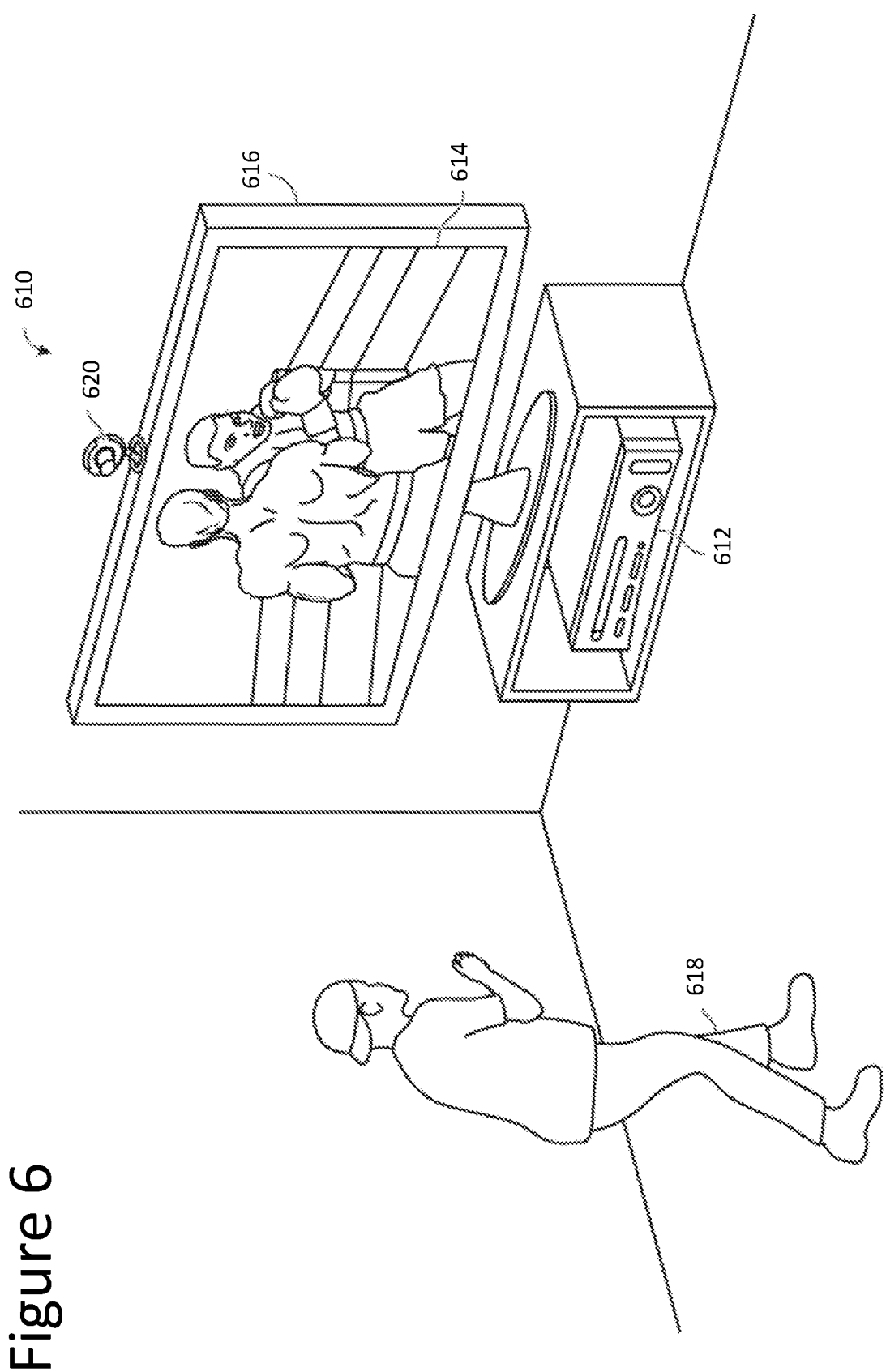
FIG. 6 is another example of an interactive system.

While FIGS. 1-5 depict a specific system that uses a head mounted display device, other systems that use more other types of processors (including more generic processors) and display devices can also be used to implement the technology described herein. For example, FIG. 6 illustrates an example embodiment of a tracking system 610 interacting with a user 618. In an example embodiment, the system 610 may be used to recognize, analyze, and/or track a human target such as the user 618 or other objects within range of tracking system 610 and interact with the user.

As shown in FIG. 6, tracking system 610 may include a computing system 612. The computing system 612 may be a computer, a gaming system or console, or the like. According to an example embodiment, the computing system 12 may include hardware components and/or software components such that computing system 12 may be used to execute applications such as gaming applications, non-gaming applications, or the like. In one embodiment, computing system 612 may include a processor such as a standardized processor, a specialized processor, a microprocessor, or the like that may execute instructions stored on a processor readable storage device for performing the processes described herein.

Tracking system 610 may further include a capture device 620. The capture device 620 may be, for example, a camera that may be used to visually monitor one or more users, such as the user 618, such that gestures and/or movements performed by the one or more users may be captured, analyzed, and tracked to perform one or more controls or actions within the application and/or animate an avatar or on-screen character, as will be described in more detail below.

According to one embodiment, the tracking system 610 may be connected to an audiovisual device 616 such as a television, a monitor, a high-definition television (HDTV), or the like that may provide game or application visuals and/or audio to a user such as the user 618. For example, the computing system 612 may include a video adapter such as a graphics card and/or an audio adapter such as a sound card that may provide audiovisual signals associated with the game application, non-game application, or the like. The audiovisual device 616 may receive the audiovisual signals from the computing system 612 and may then output the game or application visuals and/or audio associated with the audiovisual signals to the user 618. According to one embodiment, the audiovisual device 616 may be connected to the computing system 612 via, for example, an S-Video cable, a coaxial cable, an HDMI cable, a DVI cable, a VGA cable, component video cable, or the like.

Tracking system 610 may be used to recognize, analyze, and/or track a human target such as the user 618 (or a portion of the user's body such as the user's hands). For example, the user 18 may be tracked using the capture device 620 such that the gestures and/or movements of user 618 may be captured to animate an avatar or on-screen character and/or may be interpreted as controls that may be used to affect the application being executed by computer environment 612, such as controlling the display of an image (e.g., a 2D image or a 3D holographic image).

In example embodiments, the human target such as the user 618 may have an object. In such embodiments, the user of an electronic game may be holding the object such that the motions of the user and the object may be used to adjust and/or control parameters of the interaction. For example, the motion of a user holding a wand may be tracked and utilized for controlling an on-screen image. Objects not held by the user can also be tracked, such as objects thrown, pushed or rolled by the user (or a different user) as well as remote controlled objects.

Figure 7:
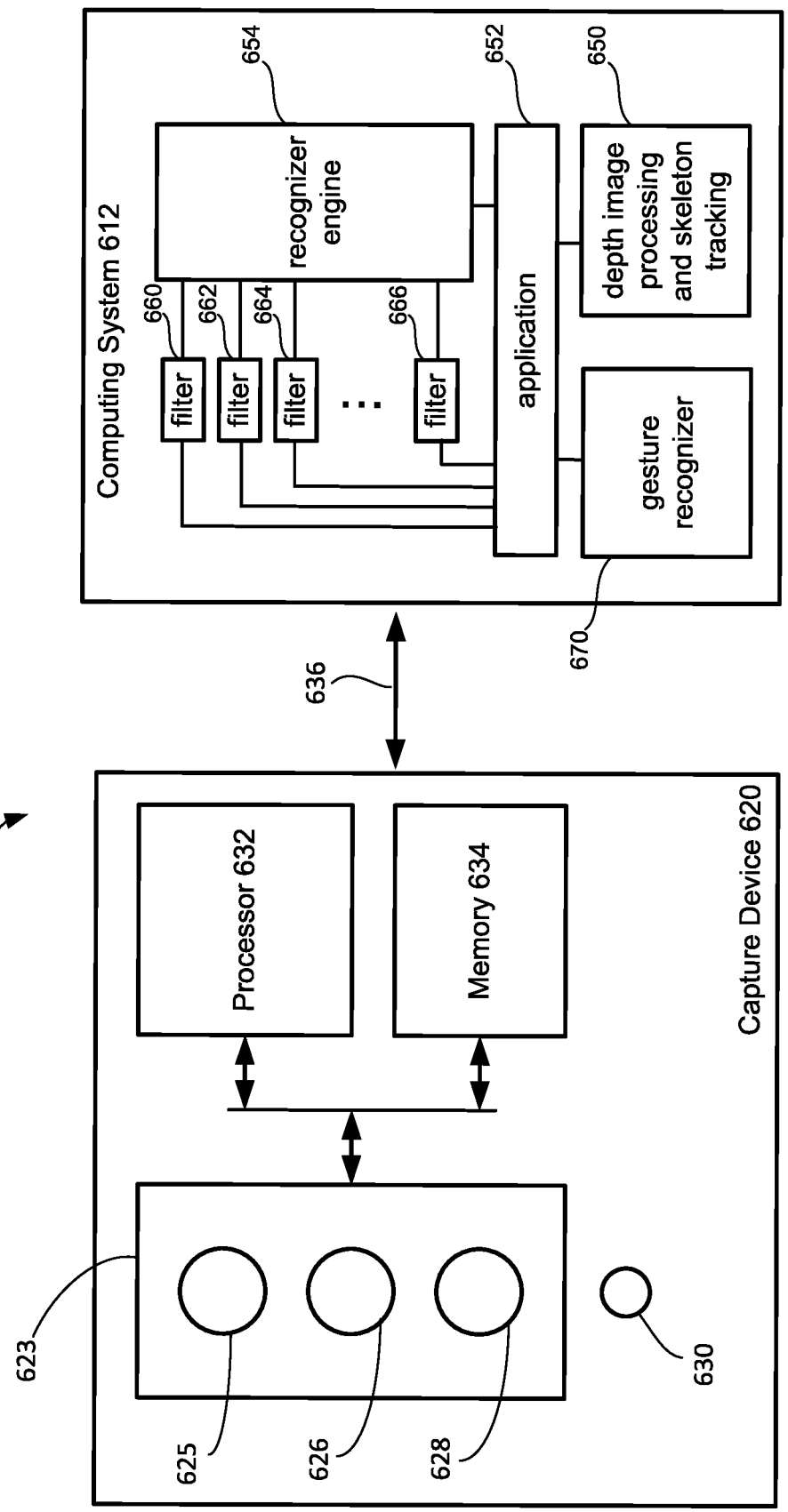
FIG. 7 illustrates an example embodiment of a capture device that may be used as part of the interactive system of FIG. 6.

FIG. 7 illustrates an example embodiment of the capture device 620 that may be used in the tracking system 610. According to an example embodiment, the capture device 620 may be configured to capture video with depth information including a depth image that may include depth values via any suitable technique including, for example, time-of-flight, structured light, stereo image, or the like. According to one embodiment, the capture device 620 may organize the depth information into "Z layers," or layers that may be perpendicular to a Z axis extending from the depth camera along its line of sight.

As shown in FIG. 7, the capture device 620 may include a camera component 623. According to an example embodiment, the camera component 623 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 7, according to an example embodiment, the camera component 623 may include an infra-red (IR) light component 625, a three-dimensional (3-D) camera 626, and an RGB (visual image) camera 628 that may be used to capture the depth image of a scene. For example, in time-of-flight analysis, the IR light component 625 of the capture device 620 may emit an infrared light onto the scene and may then use sensors (not shown) to detect the backscattered light from the surface of one or more targets and objects in the scene using, for example, the 3-D camera 26 and/or the RGB camera 628. In some embodiments, pulsed infrared light may be used such that the time between an outgoing light pulse and a corresponding incoming light pulse may be measured and used to determine a physical distance from the capture device 620 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 620 to a particular location on the targets or objects by analyzing the intensity of the reflected beam of light over time via various techniques including, for example, shuttered light pulse imaging.

In another example embodiment, the capture device 620 may use a structured light to capture depth information. In such an analysis, patterned light (i.e., light displayed as a known pattern such as grid pattern, a stripe pattern, or different pattern) may be projected onto the scene via, for example, the IR light component 624. Upon striking the surface of one or more targets or objects in the scene, the pattern may become deformed in response. Such a deformation of the pattern may be captured by, for example, the 3-D camera 626 and/or the RGB camera 628 (and/or other sensor) and may then be analyzed to determine a physical distance from the capture device to a particular location on the targets or objects. In some implementations, the IR Light component 625 is displaced from the cameras 625 and 626 so triangulation can be used to determined distance from cameras 625 and 626. In some implementations, the capture device 620 will include a dedicated IR sensor to sense the IR light, or a sensor with an IR filter.

According to another embodiment, the capture device 620 may include two or more physically separated cameras that may view a scene from different angles to obtain visual stereo data that may be resolved to generate depth information. Other types of depth image sensors can also be used to create a depth image.

The capture device 620 may further include a microphone 630. The microphone 630 may include a transducer or sensor that may receive and convert sound into an electrical signal. According to one embodiment, the microphone 630 may be used to reduce feedback between the capture device 620 and the computing system 612 in the target recognition, analysis, and tracking system 610. Additionally, the microphone 630 may be used to receive audio signals that may also be provided by to computing system 612.

In an example embodiment, the capture device 620 may further include a processor 632 that may be in communication with the image camera component 622. The processor 632 may include a standardized processor, a specialized processor, a microprocessor, or the like that may execute instructions including, for example, instructions for receiving a depth image, generating the appropriate data format (e.g., frame) and transmitting the data to computing system 612.

The capture device 620 may further include a memory component 34 that may store the instructions that are executed by processor 632, images or frames of images captured by the 3-D camera and/or RGB camera, or any other suitable information, images, or the like. According to an example embodiment, the memory component 634 may include random access memory (RAM), read only memory (ROM), cache, flash memory, a hard disk, or any other suitable storage component. As shown in FIG. 7, in one embodiment, memory component 634 may be a separate component in communication with the image capture component 622 and the processor 632. According to another embodiment, the memory component 634 may be integrated into processor 632 and/or the image capture component 622.

As shown in FIG. 7, capture device 620 may be in communication with the computing system 612 via a communication link 636. The communication link 636 may be a wired connection including, for example, a USB connection, a Firewire connection, an Ethernet cable connection, or the like and/or a wireless connection such as a wireless 802.11b, g, a, or n connection. According to one embodiment, the computing system 612 may provide a clock to the capture device 620 that may be used to determine when to capture, for example, a scene via the communication link 636. Additionally, the capture device 620 provides the depth information and visual (e.g., RGB) images captured by, for example, the 3-D camera 626 and/or the RGB camera 628 to the computing system 612 via the communication link 636. In one embodiment, the depth images and visual images are transmitted at 30 frames per second. The computing system 612 may then use the model, depth information, and captured images to, for example, control an application such as moving an image displayed by a monitor, projector, head mounted display device, etc.

Computing system 612 includes depth image processing and skeletal tracking module 650, which uses the depth images to track one or more persons detectable by the depth camera. Depth image processing and skeletal tracking module 650 provides the tracking information to application 652, which can be a video game, productivity application, communications application or other software application etc. The audio data and visual image data is also provided to application 652 and depth image processing and skeletal tracking module 650. Application 652 provides the tracking information, audio data and visual image data to recognizer engine 654. In another embodiment, recognizer engine 654 receives the tracking information directly from depth image processing and skeletal tracking module 50 and receives the audio data and visual image data directly from capture device 620.

Recognizer engine 654 is associated with a collection of filters 660, 662, 664, . . . , 666 each comprising information concerning a gesture, action or condition that may be performed by any person or other type of moving object detectable by capture device 620. For example, the data from capture device 20 may be processed by filters 660, 662, 664, . . . , 666 to identify when a user or other type of moving object has performed one or more gestures or other actions. Those gestures may be associated with various controls, objects or conditions of application 652. Thus, the computing environment 612 may use the recognizer engine 654, with the filters, to interpret movements.

Capture device 620 of FIG. 7 provides RGB images (or visual images in other formats or color spaces) and depth images to computing system 612. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device.

Recognizer engine 654 (of computing system 612 depicted in FIG. 7) includes multiple filters 660, 662, 664, . . . , 666 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand must travel (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

The recognizer engine 654 may have a base recognizer engine that provides functionality to the filters. In one embodiment, the functionality that the recognizer engine 654 implements includes an input-over-time archive that tracks recognized gestures and other input, a Hidden Markov Model implementation (where the modeled system is assumed to be a Markov process—one where a present state encapsulates any past state information necessary to determine a future state, so no other past state information must be maintained for this purpose—with unknown parameters, and hidden parameters are determined from the observable data), as well as other functionality required to solve particular instances of gesture recognition.

Filters 660, 662, 664, . . . , 666 are loaded and implemented on top of the recognizer engine 654 and can utilize services provided by recognizer engine 654 to all filters 660, 662, 664, . . . , 666. In one embodiment, recognizer engine 54 receives data to determine whether it meets the requirements of any filter 660, 662, 664, . . . , 666. Since these provided services, such as parsing the input, are provided once by recognizer engine 54 rather than by each filter 660, 662, 664, . . . , 666, such a service need only be processed once in a period of time as opposed to once per filter for that period, so the processing required to determine gestures is reduced.

Application 652 may use the filters 660, 662, 664, . . . , 666 provided with the recognizer engine 654, or it may provide its own filter, which plugs in to recognizer engine 654. In one embodiment, all filters have a common interface to enable this plug-in characteristic. Further, all filters may utilize parameters, so a single gesture tool below may be used to debug and tune the entire filter system.

Figure 8:
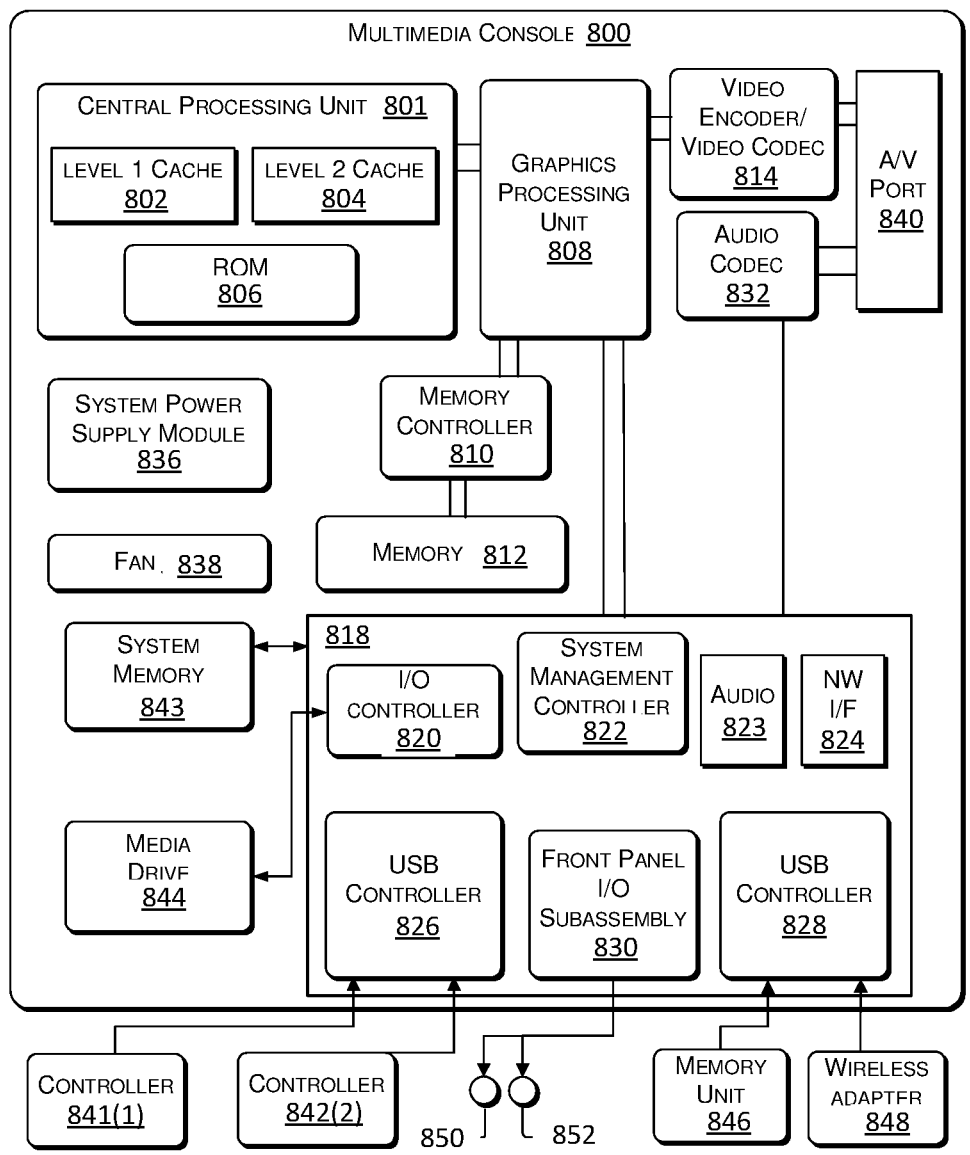
FIG. 8 illustrates an example embodiment of a computing system that can implement a portion of the interactive system of FIG. 6.

FIG. 8 illustrates an example embodiment of a computing system that may be used to implement computing system 612 used to track motion and gestures of a moving object (e.g., a hand, a wand, a remote controlled drone) and control/move an image based on the tracking of motion and gestures. The computing system such as the computing system 612 described above may be a multimedia console 800, such as a gaming console. As shown in FIG. 8, the multimedia console 800 has a central processing unit (CPU) 801 having a level 1 cache 802, a level 2 cache 804, and a flash ROM (Read Only Memory) 806. The level 1 cache 1802 and a level 2 cache 804 temporarily store data and hence reduce the number of memory access cycles, thereby improving processing speed and throughput. The CPU 801 may be provided having more than one core, and thus, additional level 1 and level 2 caches 802 and 804. The flash ROM 806 may store executable code that is loaded during an initial phase of a boot process when the multimedia console 800 is powered on.

A graphics processing unit (GPU) 808 and a video encoder/video codec (coder/decoder) 814 form a video processing pipeline for high speed and high resolution graphics processing. Data is carried from the graphics processing unit 108 to the video encoder/video codec 814 via a bus. The video processing pipeline outputs data to an A/V (audio/video) port 840 for transmission to a television or other display. A memory controller 810 is connected to the GPU 808 to facilitate processor access to various types of memory 812, such as, but not limited to, a RAM (Random Access Memory).

The multimedia console 800 includes an I/O controller 820, a system management controller 822, an audio processing unit 823, a network interface controller 824, a first USB host controller 8, a second USB controller 828 and a front panel I/O subassembly 830 that are preferably implemented on a module 818. The USB controllers 826 and 828 serve as hosts for peripheral controllers 842(1)-842(2), a wireless adapter 848, and an external memory device 846 (e.g., flash memory, external CD/DVD ROM drive, removable media, etc.). The network interface and/or wireless adapter 848 provide access to a network (e.g., the Internet, home network, etc.) and may be any of a wide variety of various wired or wireless adapter components including an Ethernet card, a modem, a Bluetooth module, a cable modem, and the like. Cameras 626, 628 and capture device 620 may define additional input devices for the console 900 via USB controller 926 or other interface.

System memory 843 is provided to store application data that is loaded during the boot process. A media drive 844 is provided and may comprise a DVD/CD drive, Blu-Ray drive, hard disk drive, or other removable media drive, etc. The media drive 844 may be internal or external to the multimedia console 800. Application data may be accessed via the media drive 144 for execution, playback, etc. by the multimedia console 100. The media drive 844 is connected to the I/O controller 1820 via a bus, such as a Serial ATA bus or other high speed connection (e.g., IEEE 1394).

The system management controller 822 provides a variety of service functions related to assuring availability of the multimedia console 800. The audio processing unit 823 and an audio codec 832 form a corresponding audio processing pipeline with high fidelity and stereo processing. Audio data is carried between the audio processing unit 823 and the audio codec 832 via a communication link. The audio processing pipeline outputs data to the A/V port 840 for reproduction by an external audio user or device having audio capabilities.

The front panel I/O subassembly 830 supports the functionality of the power button 850 and the eject button 852, as well as any LEDs (light emitting diodes) or other indicators exposed on the outer surface of the multimedia console 800. A system power supply module 836 provides power to the components of the multimedia console 800. A fan 838 cools the circuitry within the multimedia console 800.

The CPU 801, GPU 808, memory controller 810, and various other components within the multimedia console 800 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 800 is powered on, application data may be loaded from the system memory 843 into memory 812 and/or caches 802, 804 and executed on the CPU 801. The application may present a graphical user interface that provides a consistent user experience when navigating to different media types available on the multimedia console 800. In operation, applications and/or other media contained within the media drive 844 may be launched or played from the media drive 844 to provide additional functionalities to the multimedia console 800.

The multimedia console 800 may be operated as a standalone system by simply connecting the system to a television or other display. In this standalone mode, the multimedia console 100 allows one or more users to interact with the system, watch movies, or listen to music. However, with the integration of broadband connectivity made available through the network interface 824 or the wireless adapter 848, the multimedia console 800 may further be operated as a participant in a larger network community. Note that FIG. 8 provides an example of one or more non-transitory processor readable storage devices storing processor readable code for programming a processor to perform a method for navigating a holographic map, as described below.

Looking back at FIGS. 1-5, a head mounted display device is presented that projects holographic images into a mixed reality environment. In many cases, there is no mouse and keyboard. Navigating about the holographic images is not intuitive based on old interfaces. Therefore, a new technology is proposed for navigating holographic images. The system of FIGS. 6-8 can also be used to perform all or a part of the navigation of holographic images displayed by a head mounted display system. Alternatively, the technology proposed for navigating holographic images can also be used to navigate images displayed on monitor 614 as well as other 2D and 3D images presented using other display devices.

Figure 9A:
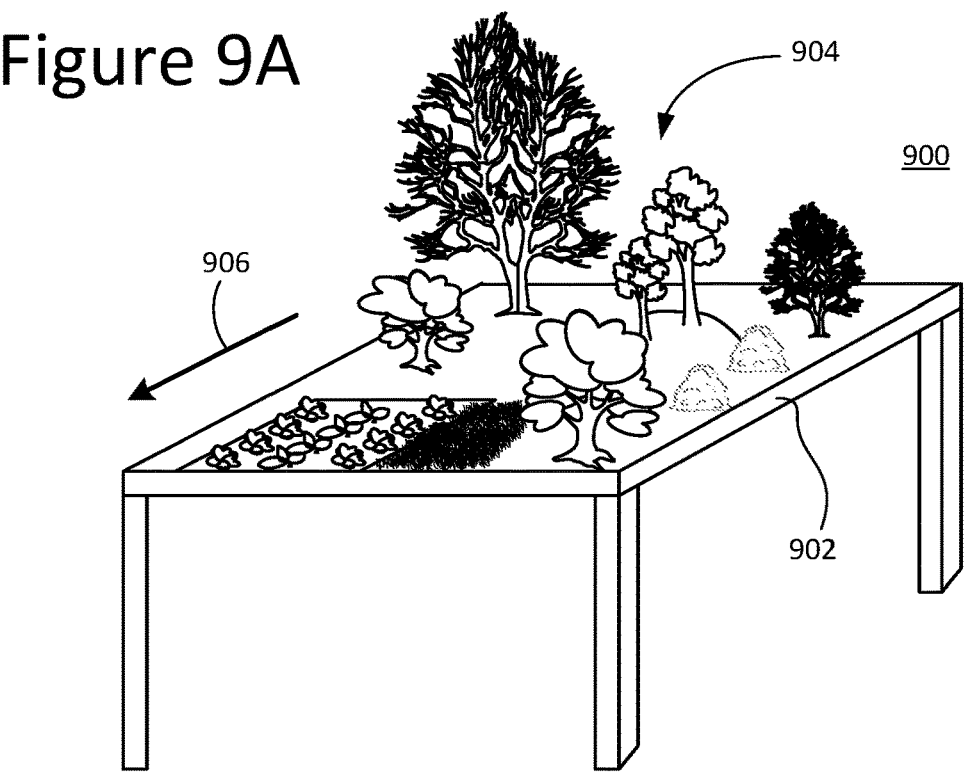
FIGS. 9A-C depicts a holographic image in a mixed reality environment as viewed through a head mounted display device.
Figure 9B:
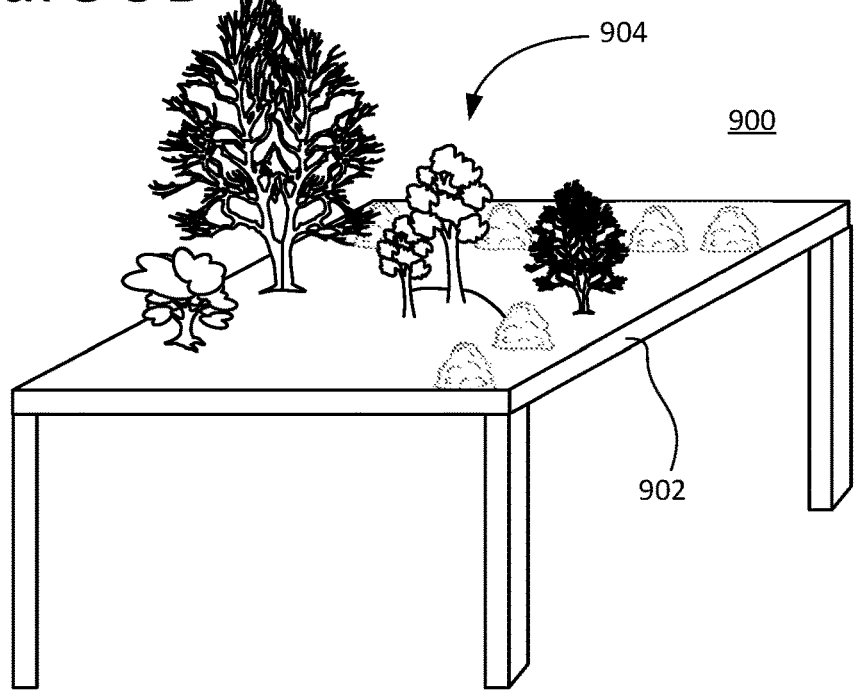
Figure 9C:
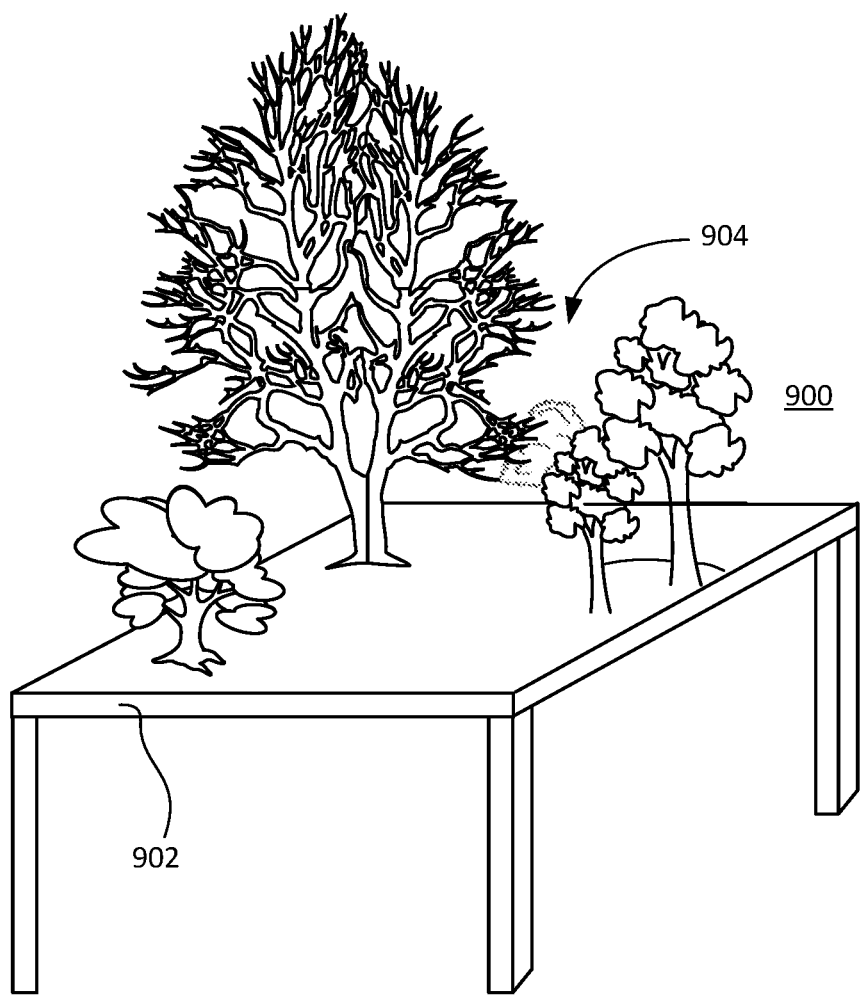

FIGS. 9A-C graphically explain the notion of navigating a holographic image. For example, FIG. 9A depicts a mixed reality environment 900 as seen through a head mounted display device 32. Mixed reality environment 900 includes a table 902 that exists in the real world (so table 902 is not a virtual image). FIG. 9A shows that mixed reality environment 900 includes a holographic image 904 projected on top of table 902. In one embodiment, holographic image 904 is a three dimensional (3D) map but other 3D holographic images as well as other two dimensional (2D) images can also be used. In the depicted example, holographic image 904 is a 3D map of a forest or park. Other types of maps (e.g., street maps, topographical maps, etc.) can also be used.

In one embodiment, navigating about holographic image 904 includes moving holographic image 904. Two examples of moving holographic image 904 include panning the image and zooming the image. In some examples, panning is a horizontal movement of the image. In some embodiments, panning could include some vertical motion too. Because the mixed reality environment is three dimensional, horizontal motion could be relative. Therefore, in some embodiments, panning includes motion in two dimensions. Panning could also be thought of as sliding the image. The concept of zooming includes moving the point of view closer to the image (thereby making the image look bigger) or moving the point of view further from the image (thereby making the image look smaller). In other embodiments, other types of motion can also be included when navigating the holographic image, including rolling the image, tilting the image, etc.

FIG. 9A shows arrow 906 which points in a direction to show one example for panning. If holographic image 904 is panned in the direction of arrow 906, then after some amount of panning the state of holographic image 904 will be as depicted in FIG. 9B. In this embodiment, table 902 is not big enough to support the entire map of holographic image 904. Therefore, only the portion of the holographic image that is over table 902 is being displayed. As holographic image 904 is panned in the direction of arrow 906, a portion of holographic image 904 is moved off of table 902, and, thus, disappears. Additionally, a new portion of holographic image 904 is now located over table 902 so it newly appears. Thus, the map appears a bit changed from FIG. 9A to 9B such that some components in the foreground are missing and some components in the background have been added.

Looking back at FIG. 9A, holographic image 904 can also be zoomed. For example, FIG. 9C depicts one example of zooming holographic image 904. The components of holographic image 904 appear much bigger. Because the size of holographic image 904 is bigger, not all of the components depicted in FIG. 9A will still fit on top of table 902. Thus, some of the components depicted in FIG. 9A are no longer appearing in FIG. 9C. The transition from FIG. 9A to FIG. 9C is referred to as zooming in into the image. If holographic image 904 was zoomed out, the components depicted in FIG. 9A would appear smaller and there would be additional components added on top of table 902.

Figure 10:
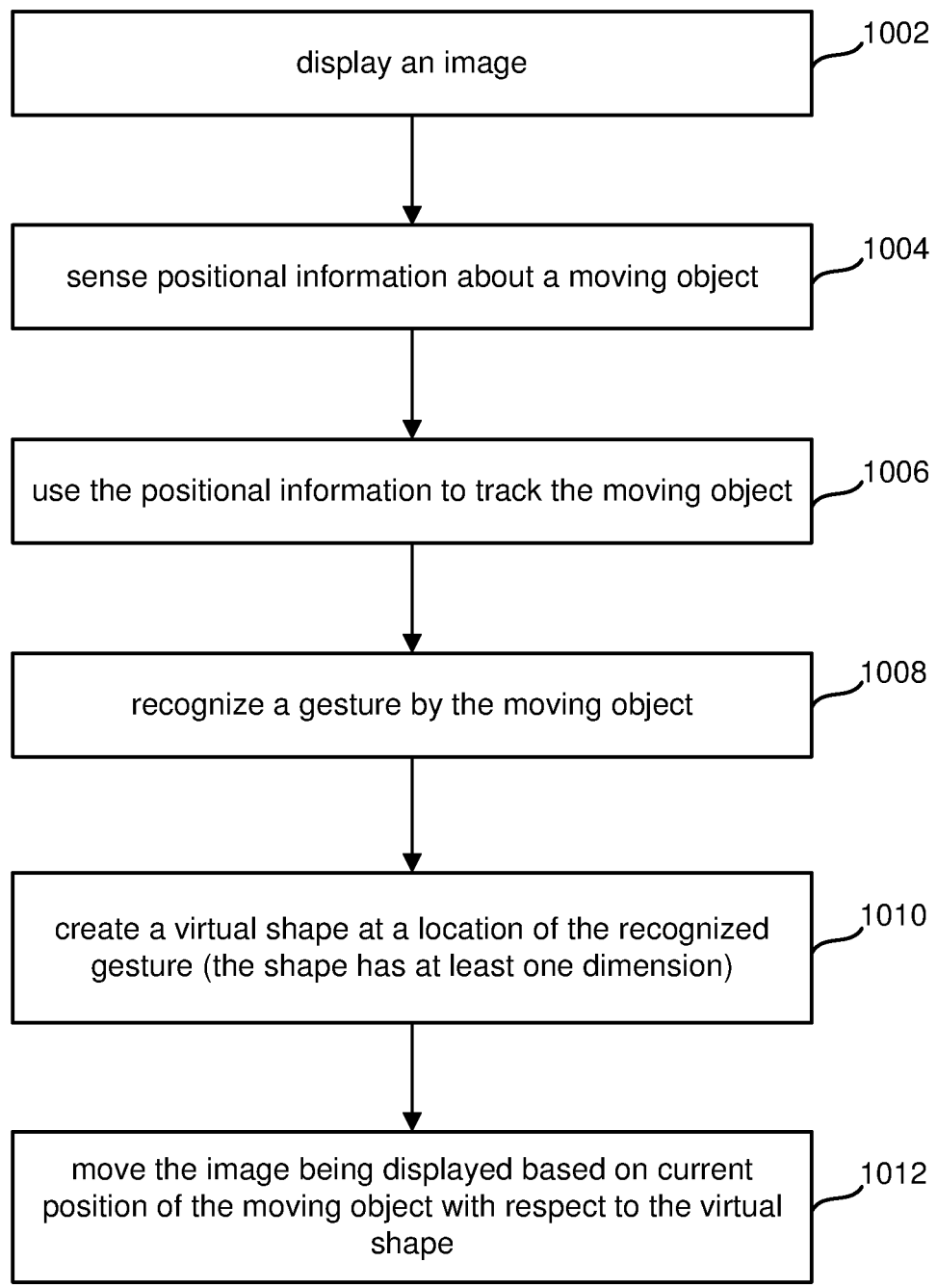
FIG. 10 is a flow chart describing one embodiment of a process for navigating an image.

FIG. 10 depicts a flow chart describing one embodiment of a process for navigating an image, such as a holographic image. For example, the process of FIG. 10 can be used to do the panning and zooming described above with respect to FIGS. 9A, 9B and 9C. The process of FIG. 10 can be performed by a head mount display device and related systems described in FIGS. 1-5. Alternatively, or in addition, the process of FIG. 10 can also be performed using the interactive system of FIGS. 6-8. Other systems can also perform the process of FIG. 10.

In step 1002 of FIG. 10, the system displays an image. The display system can be a video monitor, a projector, a video driver circuit configured to be in communication with the video monitor or projector, a head mounted display device that presents a mixed reality environment or another apparatus cable for providing a visual presentation. More details of one embodiment of step 1002 is described below with respect to FIG. 11.

In step 1004, the system senses position information about a moving object. As described above with respect to the system of FIGS. 1-5, position information can be sensed about a user's hands being moved in front of the head mounted display device. Alternatively, other body parts can be tracked. In other embodiments, the moving object does not need to be a body part. For example, the user can hold an apparatus that is being sensed. In another embodiment, the moving object does not need to be held or in contact with the user. For example, an aircraft, automobile, or an automated device, or semi-automated device can be used. The system, such as the system described above, will include one or more sensors. The output of the one or more sensors (image sensors, depth sensors, radar, infrared sensors, etc.) is positional information that is used by software and/or hardware to determine the location of the moving object being tracked. In step 1006, the system uses the sensed positional information from step 1004 to track the moving object. Tracking a moving object includes determining its location one or more times. For example, the system can determine 3D coordinates for a moving object periodically. In other embodiments, the tracking does not need to be using 3D coordinates.

In step 1008, the system recognizes a gesture made by the moving object. A gesture could be made by hand, other body part or other type of object. For example, a user can manipulate a puppet, a wand or other structure to perform a gesture. More details about step 1008 are described below with respect to FIG. 12.

In step 1010, the system creates a virtual shape at the location of the recognized gesture. That virtual shape that is created in step 1010 has at least one dimension. A shape is the form of an object or its external boundary, outline or external surface, as opposed to other properties such as color, texture or material composition. Common two dimensional shapes are circles, squares, triangles, etc. Common three dimensional shapes are spheres, cubes, pyramids, etc. A point has zero dimensions. A straight line is a shape with one dimension. A curved line has two dimensions, as a generalization of a line. In general, a surface can be used to denote a (n−1) dimensional sub manifold of a n-dimensional manifold, or in general, any co dimension-1 sub object in an object. A plane is a flat, two dimensional surface. Planes can arise as subspaces in some higher dimensional space, as with a room's walls or they may enjoin independent existence in their own right, as in the setting of Euclidean geometry. Planes are often thought to extend infinitely; however, for purposes of this document, a plane can also have a finite extension. The term virtual means that it is simulated or otherwise not in a real world. The virtual shape is a shape that is simulated or otherwise not in the physical real world. For example, a virtual shape can be projected into a view of the real world (mixed reality environment) by a head mounted display device or could be otherwise defined based on the coordinate system of the mixed reality environment without being displayed. The virtual shape can be any of the shapes discussed above. In one embodiment, the virtual shape is a plane and is referred to as the Interactive Plane. In other embodiments, the virtual shape is a virtual surface. More details of step 1010 are provided below with respect to FIG. 13. In one embodiment, the system is configured to dynamically determine a direction to orient the virtual shape based on the location of the recognized gesture In step 1012 of FIG. 10, the system moves the image (e.g., the holographic image) being displayed based on the current position of the moving object tracked via steps 1004 and 1006 with respect to the virtual shape (created in step 1010) and the location of the recognized gesture. As discussed above, the moving of the image could include panning and/or zooming, as well as other movements such as rolling tilting, etc. More details of step 1012 are provided below with respect to FIG. 14.

FIGS. 11-14 provide more details of embodiments of FIG. 10 that use the head mounted display device and hand gestures to navigate holographic images. Such embodiments, include recognizing a hand gesture, creating a virtual plane at the location of the recognized hand gesture such that the virtual plane is facing the user (e.g., facing the head mounted display device), comparing position of the hand in relation to the virtual plane, and choosing the navigation tool and using that chosen navigation tool to navigate the holographic image based on comparing current position of the hand in relation to the virtual plane.

Figure 11:
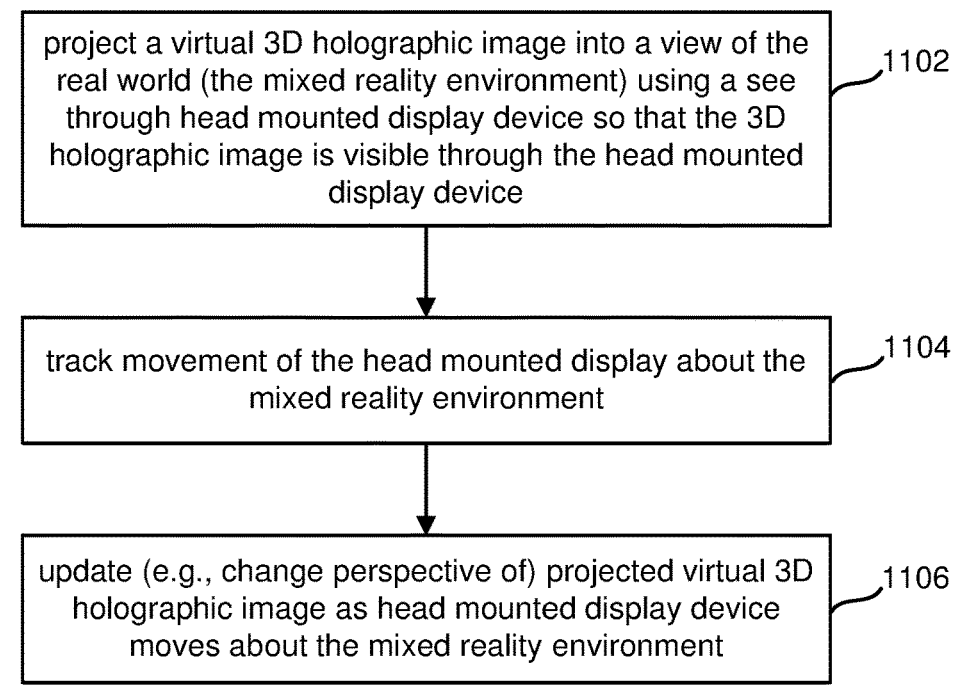
FIG. 11 is a flow chart describing one embodiment of a process for displaying an image.

FIG. 11 depicts a flow chart describing one embodiment of a process for displaying an image. That is, the process of FIG. 11 provides more details of step 1002 of FIG. 10. In step 1102 of FIG. 11, the system projects a virtual three dimensional holographic image into a view of the real world (the mixed reality environment) using a see through head mounted display device so that the 3D holographic image is visible through the head mounted display device. In step 1104, the system tracks movement of the head mounted display about the mixed reality environment. In step 1106, the system updates (e.g., change perspective of) the projected virtual three dimensional holographic image as the head mounted display device moves about the mixed reality environment.

Figure 12:
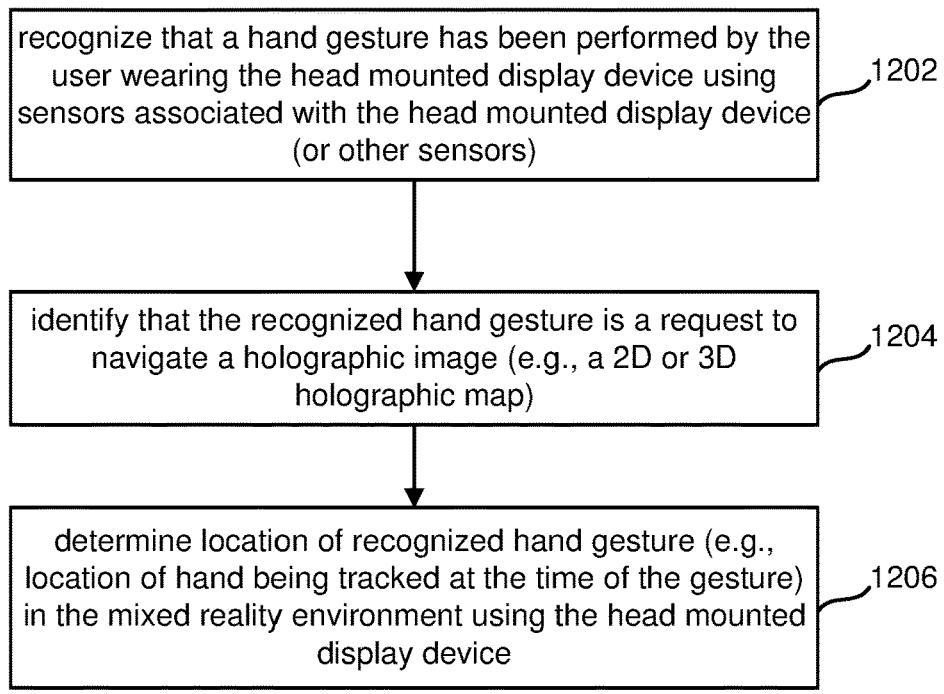
FIG. 12 is a flow chart describing one embodiment of a process for recognizing a gesture.

FIG. 12 is a flow chart describing one embodiment of a process for recognizing a gesture by the moving object. That is, the process of FIG. 12 provides one example implementation of step 1008 of FIG. 10 for the embodiment that recognizes a hand gesture using a head mounted display device. In step 1202, the system recognizes that a hand gesture has been performed by a user wearing the head mounted display device using sensors associated with the head mounted display device (as described above). In step 1204, the system identifies that the recognized hand gesture is a request to navigate a holographic image (e.g., a 2D or 3D holographic map or other image). In step 1206, the system determines the location of the recognized hand gesture (e.g., the location of the hand being tracked at the time of the gesture) in the mixed reality environment using the head mounted display device.

Figure 13:
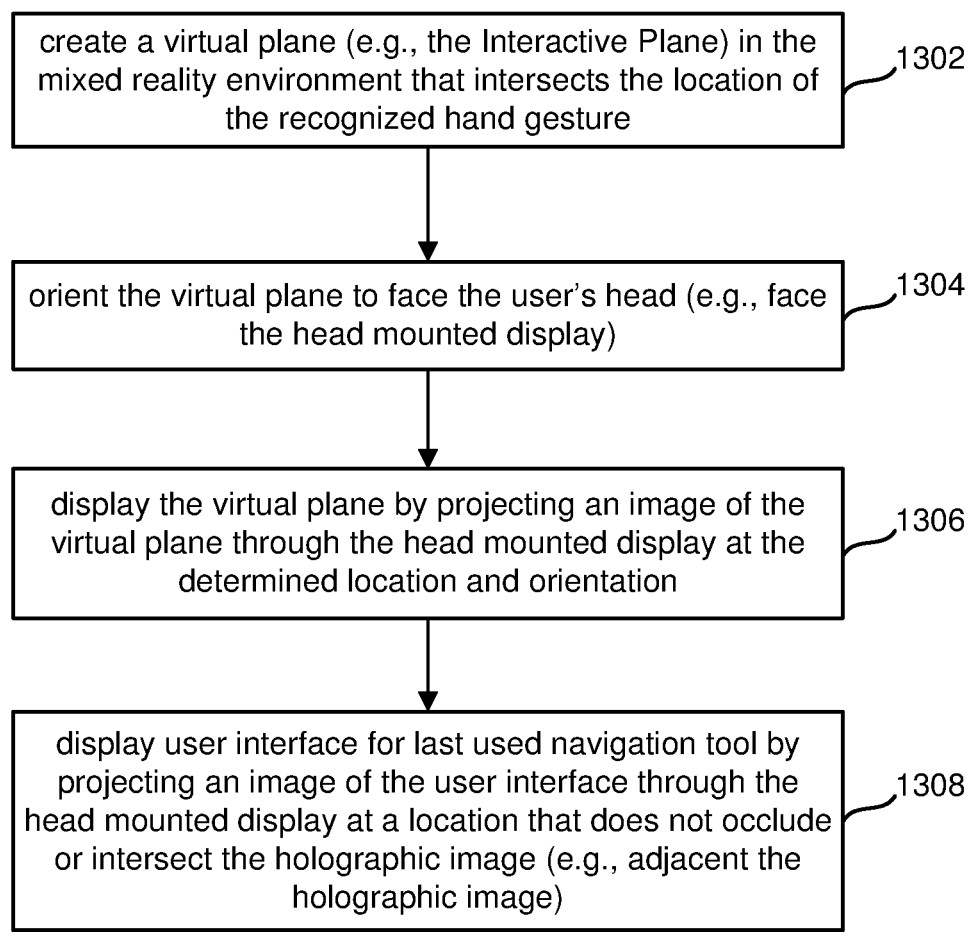
FIG. 13 is a flow chart describing one embodiment of a process for creating a virtual shape.

FIG. 13 is a flow chart describing one embodiment of a process for creating a virtual shape. The process of FIG. 13 is one example implementation of step 1010 of FIG. 10. In step 1302, the system creates a virtual plane (e.g., the interactive plane discussed above) in a mixed reality environment that intersects the location of the recognized hand gesture (see step 1206 of FIG. 12). Other shapes can also be used. In step 1304, the virtual plane is oriented to face the user's head. In one embodiment, the virtual plane faces the user's eyes by orienting the virtual plane to face the head mounted display device. One example implementation creates the virtual plane perpendicular to a line from the location of the recognized hand gesture to the user's face (or the head mounted display device). In step 1306, the virtual plane is displayed by projecting an image of the virtual plane through the head mounted display device at the determined location or orientation from steps 1302 and 1304. Some embodiments do not display the virtual plane; therefore, step 1306 optionally can be skipped. That is, while the virtual plane is still created, it may not be graphically depicted to the user through the head mounted display device. A virtual shape can be created by defining the shape. In step 1308, a user interface is displayed. In some embodiments, the navigation of the holographic image includes panning and zooming. Therefore, they still have two navigation tools. One navigation tool for panning and a second navigation tool for zooming. In one embodiment, there will be one user interface for both panning and zooming. In one example implementation, the user interface for the navigation tool last used by the user will be the one displayed. For example, if the user had last panned an image, then the user interface for panning will be displayed. If the last time the user was navigating a holographic image included zooming, then the user interface for zooming will be displayed in step 1308. In another embodiment, a default user interface can be displayed. Whatever user interface is displayed, it is projected as an image through the head mounted display device at a location that does not occlude or intersect the holographic image. In one example, the user interface is displayed adjacent to the holographic image. Note that step 1308 is optional because some embodiments do not include displaying a user interface.

Figure 14:
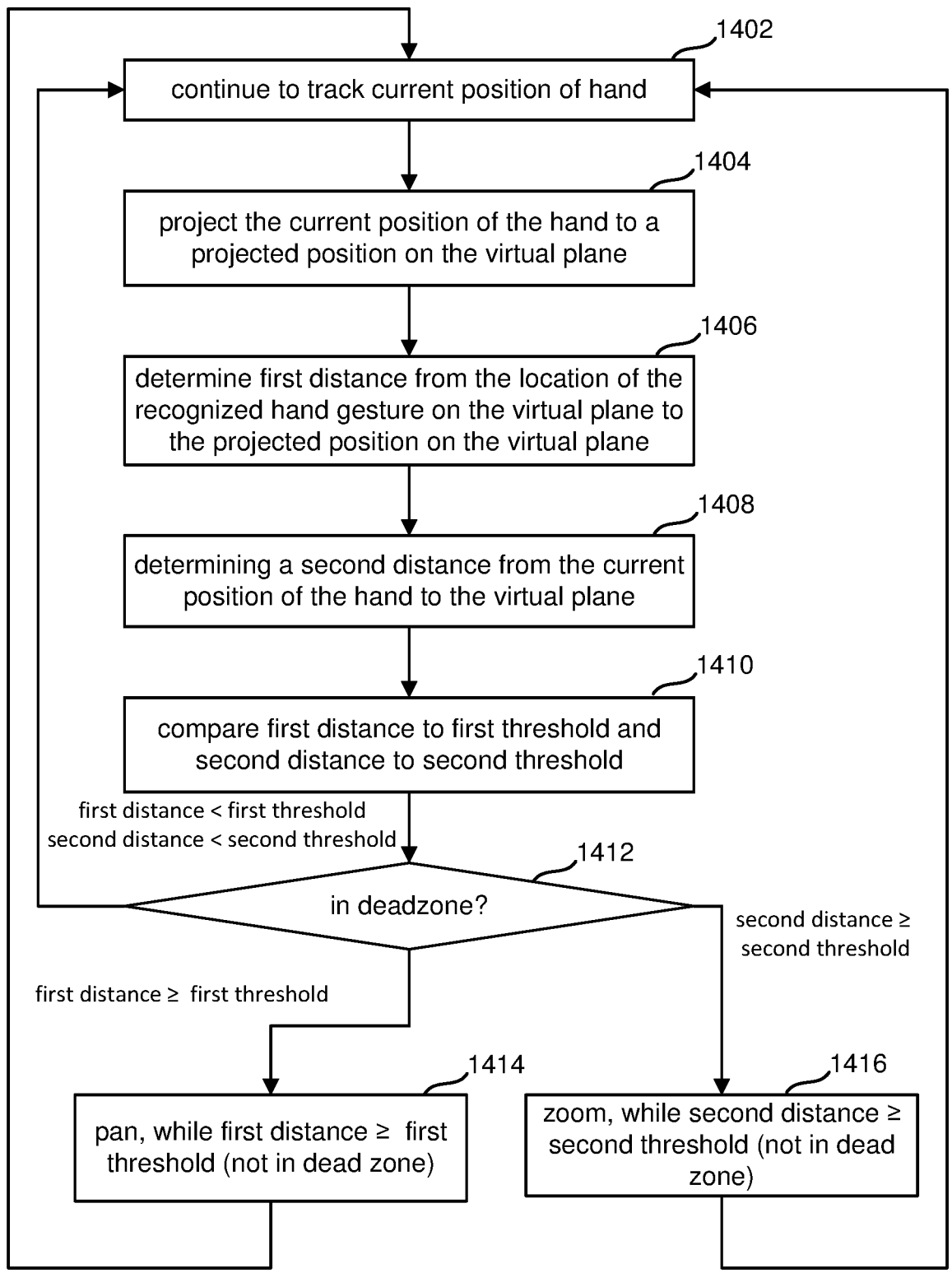
FIG. 14 is a flow chart describing one embodiment of a process for moving an image.

FIG. 14 is a flow chart describing one embodiment of a process of moving an image. In one embodiment, the process of FIG. 14 is one example implementation of step 1012 of FIG. 10. The process of FIG. 14 includes choosing a navigation tool and using that chosen navigation tool by panning the holographic image in response to tracked movement of the motion object (e.g., the hand) when the moving object is within a distance of the virtual surface and zooming the holographic image in response to tracked movement of the moving object when the moving object is outside that distance to the virtual surface. More details will be described below.

Figure 17:
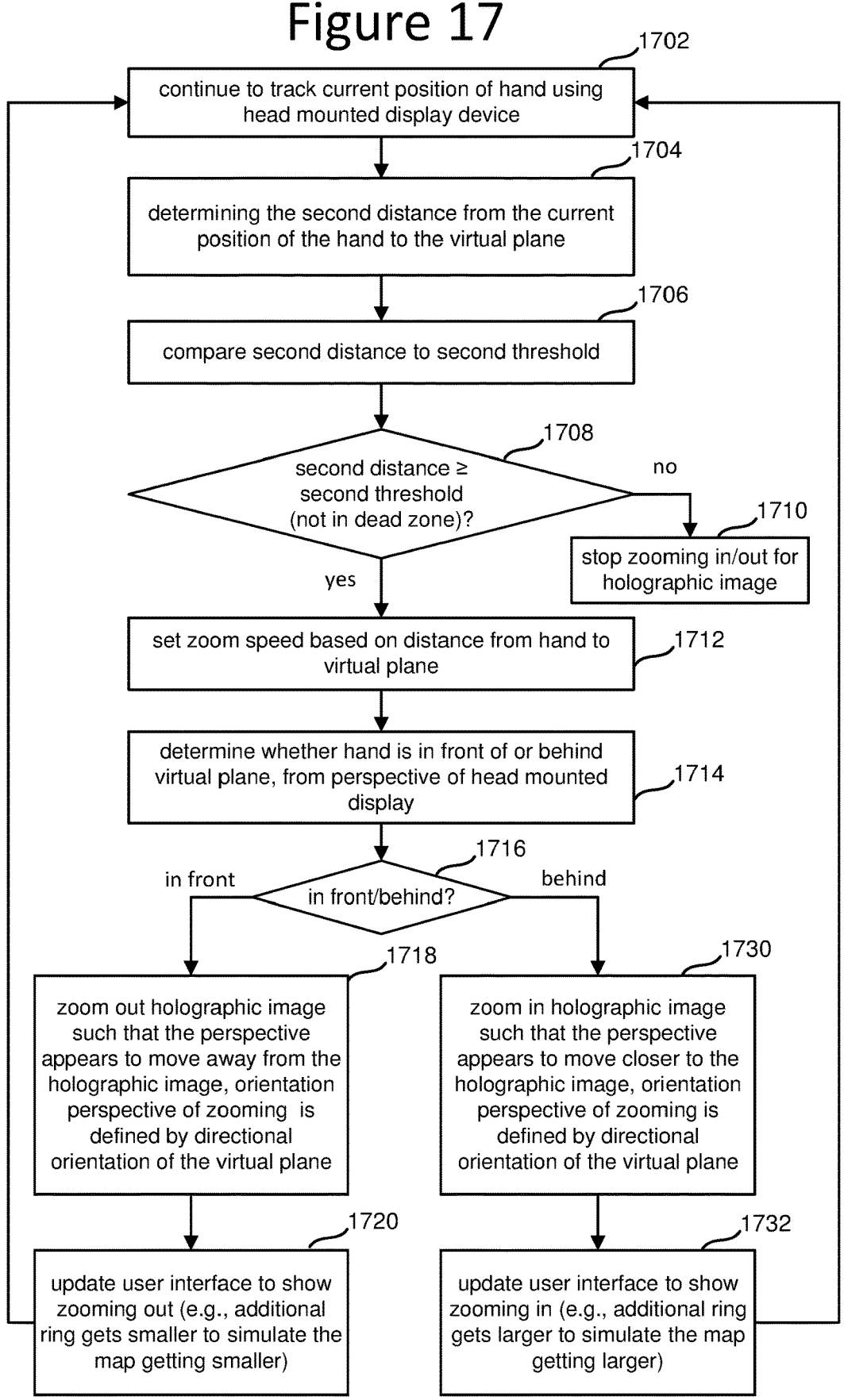
FIG. 17 is a flow chart describing one embodiment of a process for zooming an image.

In step 1402 is FIG. 14, the system tracks the current position of the hand. In one embodiment, step 1402 is continuously performed. In step 1404, the system projects the current position of the hand to a projected position on the virtual plane. The projected position on the virtual plane can be the actual intersection of the hand with the virtual plane. If the hand is not exactly on the virtual plane at the current moment, then a line will be drawn from the hand to the virtual plane, with the line being at a right angle to the virtual plane, in order to determine the projected position of the hand onto the virtual plane. In step 1406, the system determines the distance from the location of the recognized hand gesture on the virtual plane to the projected position on the virtual plane. Step 1406 refers to this as the first distance to distinguish additional distance information described below. In step 1408, the system determines a second distance, which is the distance from the current position of the hand to the virtual plane. In step 1410, the system compares the first distance to the first threshold and the second distance to the second threshold. The first threshold and the second threshold define a dead zone about the location of the recognized hand gesture. When the current position of the hand is such that the first distance is within the first threshold and the second distance is within the second threshold, then the hand is in the dead zone. If the hand is in the dead zone, then the holographic image will not be moved and the process of FIG. 14 loops back to step 1402. If it is determined that the first distance is greater than or equal to the first threshold (before determining the second distance is greater than or equal to the second threshold) then the hand is not in the dead zone and, in step 1414, the system will pan the holographic image while the first distance continues to be greater than or equal to the first threshold. FIG. 14 provides more details for panning the holographic image. Once the current position of the hand is not further from the location of the recognized hand gesture by the first threshold, the panning will stop and the process will continue at step 1402. If, step 1412, is determined that the hand has left a dead zone because the distance between the virtual plane and the current position of the hand is greater than the second threshold then the system will perform zooming of the holographic image in step 1416 as long as the second distance remains greater than the second threshold (the hand stays further away from the virtual plane by at least the second threshold). Once the hand moves closer to the virtual plane so that it enters the dead zone, then zooming stops and the process continues to step 1402. Note that FIG. 17 provides more details of step 1416.

Figure 15:
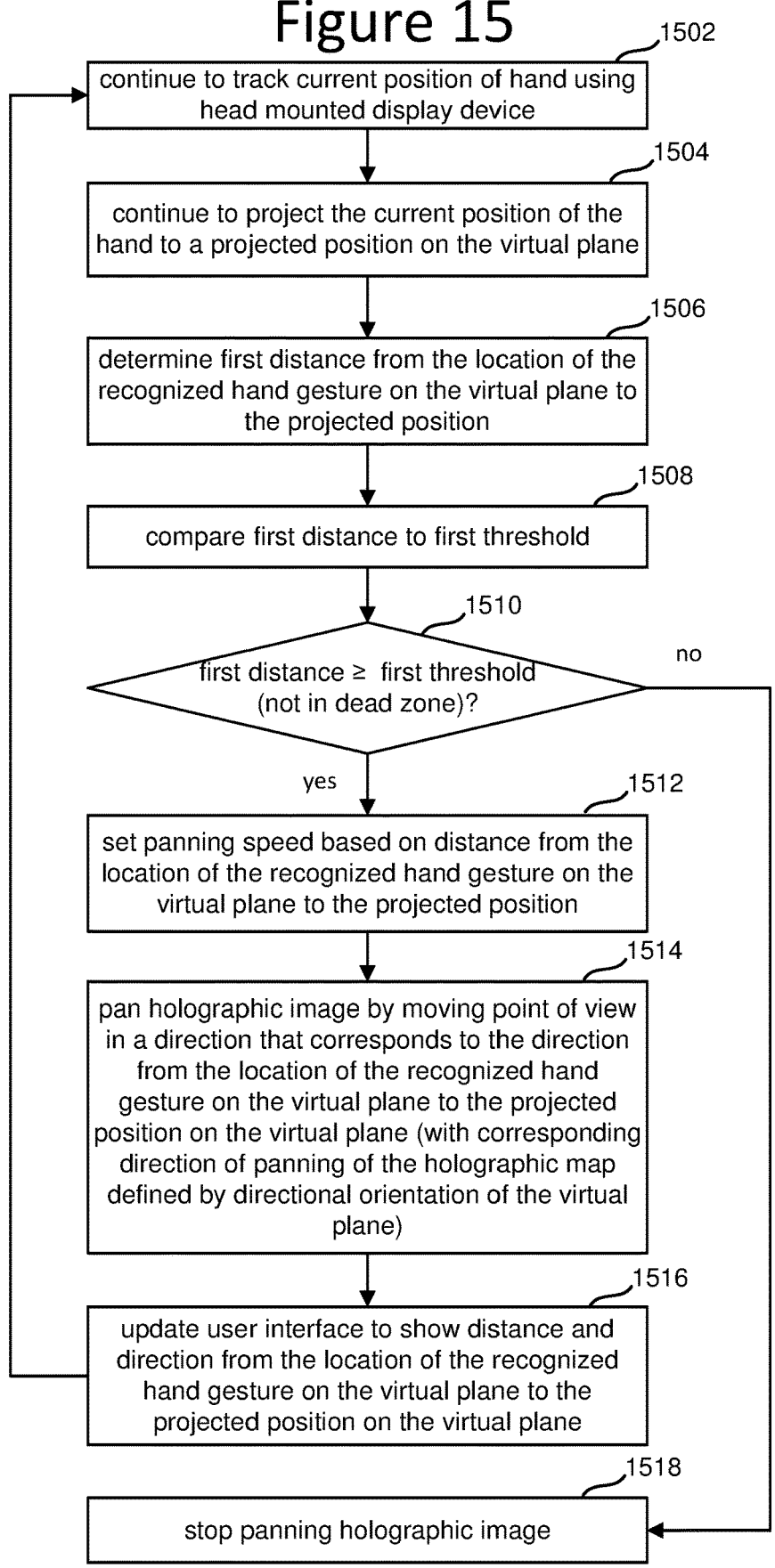
FIG. 15 is a flow chart describing one embodiment of a process for panning an image.

FIG. 15 is a flow chart describing one embodiment or process for panning the holographic image. The process of FIG. 15 is one example implementation of step 1414 of FIG. 14. In step 1502, the system continues to track the current position of the hand using the head mounted display device. Step 1502 is the same as step 1402 and can be performed continuously. In step 1504, the system continues to project the current position of the hand to a projected position on the virtual plane, as described above with respect to step 1404. In step 1506, the system determines the first distance from the location of the recognized hand gesture on the virtual plane to the projected position on the virtual plane, similar to step 1406 of FIG. 14. In step 1508, the system compares the first distance to the first threshold. If the first distance is no longer greater than or equal to the first threshold (step 1510) then the process continues to step 1518 and stops panning the holographic image, thereby ending the process of FIG. 15 (so that the process of FIG. 14 moves back to step 1402). If, however, the first distance measured between the location of the recognized hand gesture on the virtual plane to the current projected position of the hand on the virtual plane is greater than the first threshold, then the process continues to step 1512 and sets the panning speed based on distance from the location of the recognized hand gesture on the virtual plane to the projected position. That is the first distance determined in step 1506 is used to set the panning speed (the speed of which the map is sliding). In one embodiment, the map will pan at a fixed speed based on that first distance. In some examples, the distance is linearly correlated to panning speed. In other embodiments, there could be a non-linear relationship. Various mathematical functions can be used to provide a relationship between first distance and panning speed.

In step 1514, the holographic image is panned by moving the point of view in a direction that corresponds to the direction from the location of the recognized hand gesture on the virtual plane to the projected position on the virtual plane for the current position of the hand (with corresponding direction of panning of the holographic map defined by directional orientation of the virtual plane). In one example, moving the hand upward along the virtual plane causes the map to move further away, moving the hand downward causes the map to move closer, moving the hand to the right causes the map to move to the right, moving the hand to the left on the virtual plane causes the map to move to the left, etc. Moving the map to the left, right, up, down is with respect to the user's point of view. Therefore, as the user moves around the room left, right, up and down changes. Similarly as the user moves around the room the position and orientation of the virtual plane changes. Thus, the direction of panning (e.g., left, right, up, down) corresponds to the directional orientation of the virtual plane. In this manner, the panning of the holographic image is performed in response to tracked movement of the hand along the virtual plane, with direction of panning of the holographic image being defined by directional orientation of the virtual plane such that as other virtual planes at other directional orientations will establish different directions of panning the holographic map. In step 1516, the system update the user interface to show distance and direction from the location of the recognized hand gesture on the virtual plane to the projected position on the virtual plane. This provides feedback to the user. In one embodiment, the user interface is projected by the head mounted display device. After step 1516, the process loops back to step 1502.

Figure 16:
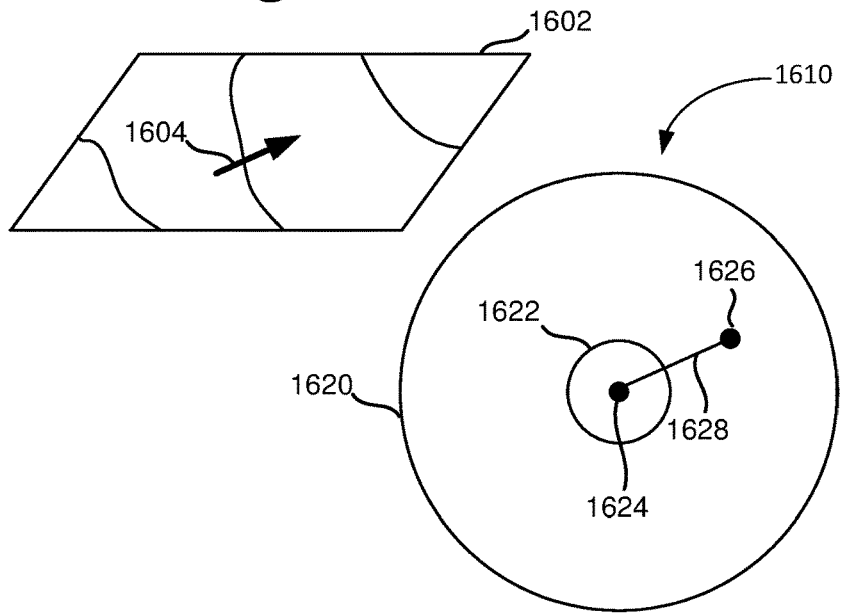
FIG. 16 depicts one example of a user interface that is depicted while panning an image.

FIG. 16 graphically depicts one example of a user interface. The elements depicted in FIG. 16 are viewed through the head mounted display device and include a virtual image 1602 and user interface 1610. FIG. 16 shows arrow 1604 indicating that virtual image 1602 is being panned or moved in a direction of arrow 1604 in response to the user's hand moving along the virtual plane. User interface includes an outer ring 1620 and an inner ring 1622. Inside inner ring 1622 is point 1624, representing the location of the recognized hand gesture on the virtual plane. Ring 1620 represents a portion (or the edge of) the virtual plane. Point 1626 indicates the projected position of the hand (current position) on the virtual plane. Line 1628 represents the distance (i.e., first distance) from the location of the recognized hand gesture on the virtual plane to the projected position. It is that distance that is used to determine the speed of panning. The direction from point 1624 to point 1626 defines the direction if panning. As the user's hand moves around, point 1626 will move, also causing line 1628 to move. When point 1626 moves inside inner ring 1622, then the hand is in the dead zone, and panning will stop.

FIG. 17 is a flow chart describing one embodiment of a process for zooming a holographic image. In one embodiment, the process of FIG. 17 provides more implementation details of step 1416 of FIG. 14. In step 1702, the system continues to track the current position of the hand using the head mounted display device. Step 1702 is analogous to step 1402 of FIG. 14 and can be performed continuously. In step 1704, the system determines the second distance from the current position of the hand to the virtual plane. In step 1706, the system compares the second distance to the second threshold. If the second distance is not greater than or equal to the second threshold (step 1708), then the hand is in a dead zone for zooming and in step 1710, the system will stop zooming the holographic image. The process of FIG. 17 will then be complete and the process of FIG. 14 loops back from step 1416 to step 1402.

However, if in step 1702 it is determined that the second distance is greater than or equal to the second threshold, then it is concluded that the hand is not in the dead zone for zooming. Thus, in step 1712, the zoom speed is set based on the distance from the current position of the hand to the virtual plane (e.g., the second distance). In one embodiment, zoom speed remains constant for a given distance. The correlation between distance and zoom speed can be linear, non-linear or any mathematical function. In step 1714, the system determines whether the hand is in front of the virtual plane or behind the virtual plane, from the perspective of the head mounted display device. If the user's hand is in the front of the virtual plane (step 1716), then in step 1718 the system will zoom out the holographic image such that the perspective appears to move away from the holographic image. Orientation perspective of zooming is defined by the directional orientation of the virtual plane. As the perspective appears to move away from the holographic image, the holographic image appears to get smaller. In step 1720, the system will update the user interface to show the zooming out. After step 1720, the process loops back to step 1702.

If, in step 1716, the system determines that the hand is behind the virtual plane, then in step 1730 the system zooms in the holographic image such that the perspective appears to move closer to the holographic image. Orientation perspective of zooming is defined by the directional orientation of the virtual plane, as discussed above. The zooming of the holographic image makes the holographic image look bigger to the user viewing the holographic image through the head mounted display device. In step 1732, the system updates the user interface to show the zooming in. After step 1732, the process loops back to step 1702.

Figure 18:
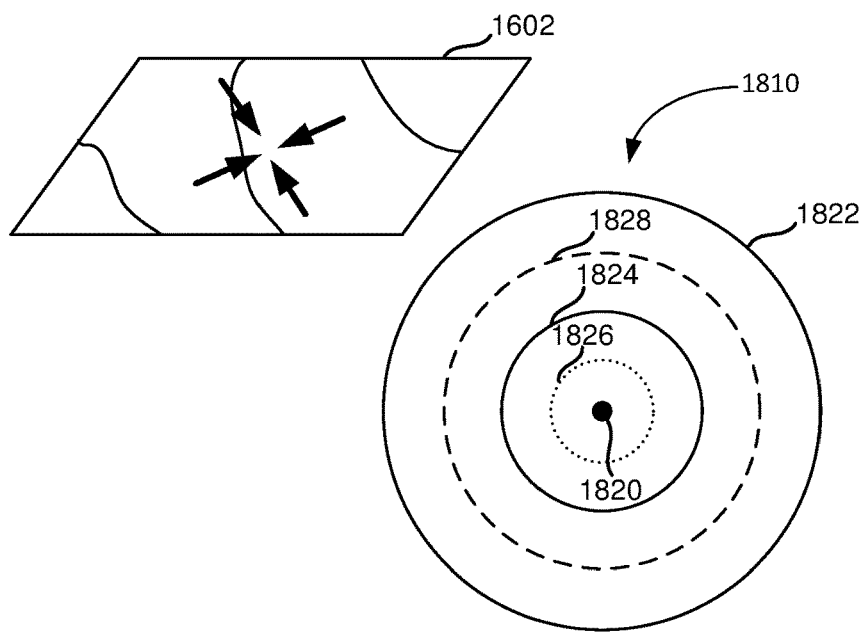
FIG. 18 depicts one example of a user interface that is depicted while panning an image.

FIG. 18 is an example of graphical depiction of a user interface for zooming. In one embodiment, the elements depicted in FIG. 18 are viewed by a user through the head mounted display device. For example, FIG. 18 shows virtual image 1602 and user interface 1810 for zooming. In this example, the user is zooming in, so four arrows pointing inward are depicted on image 1602 to simulate the zooming in. However, in one implementation, the arrows would not be included in the view through the head mounted display device. User interface 1810 includes point 1820 that corresponds to the location of the recognized hand gesture on the virtual plane, outer ring 1822 and neutral ring 1824. In one embodiment, outer ring 1822 represents the virtual plane, with the area inside the ring being the virtual plane. When the user's hand is behind the virtual plane in order to zoom in, a third ring 1828 (dash line) is depicted and gets larger to simulate the map getting larger. When the user's hand is in front of the virtual plane to zoom out a third ring 1826 (dotted line) appears and gets smaller to simulate the map getting smaller.

In the embodiment described above with respect to FIGS. 14-17, the user can either pan only or zoom only. However, the user cannot pan and zoom at the same time. While the user is panning, in order to switch to zooming, the user must first go back to the dead zone and then from the dead zone start zooming. Similarly, when users are zooming, in order to switch to panning the user must first go back to the zooming dead zone and then switch to panning In some embodiments, the user can pan and zoom at the same time by being outside both dead zones at the same time.

In one embodiment, the system moves a larger holographic image over s smaller surface, such as discussed above with respect to FIGS. 9A and 9B. In such an embodiment, the navigating the holographic images includes projecting a portion of the holographic image on a real world surface that is smaller than the area of the entire holographic image such that parts of the holographic image that not over the real world surface are not displayed; and panning the holographic image such that different portions of the holographic image are projected over the real world surface and different parts of the holographic image are not over the real world surface and not displayed.

The technology described above allows for intuitive navigation of holographic images. This technology can also be used to navigate images that are not holographic, including images on a monitor, displayed using a projector or displayed via another means.

One embodiment includes an apparatus comprising a sensor configured to sense positional information of a moving object; a display system configured to display an image; and a processor in communication with the sensor and the display system. The processor is configured to use the positional information to track the moving object. The processor is configured to recognize a gesture by the moving object. The processor is configured to create a virtual shape at a location of the recognized gesture. The shape has a dimension. The processor is configured to move the image based on current position of the moving object with respect to the virtual shape.

In one example implementation, the virtual shape is a virtual plane and the processor is configured to move the image by projecting new positions of the moving object to projected positions on the virtual plane, determining first distances from the location of the recognized gesture to the projected positions on the virtual plane and second distances from the virtual plane to the new positions, holding the image from movement while the first distances are less than a first threshold and the second distances are less than a second threshold, panning the image based on the first distances when the first distances become greater than the first threshold prior to the second distances being greater than the second threshold, and zooming the image based on the second distances when the second distances are greater than the second threshold prior to the first distances being greater than the first threshold.

One embodiment includes a method for panning and zooming a holographic image. The method comprises recognizing a hand gesture; in response to recognizing the hand gesture, creating a virtual plane facing the user at a location of the recognized hand gesture; comparing position of the hand in relation to the virtual plane; and choosing a navigation tool and using the chosen navigation tool to navigate the holographic image based on comparing current position of the hand in relation to the virtual plane.

One embodiment includes one or more non-transitory processor readable storage devices storing processor readable code for programming a processor to navigate a holographic map. The method comprises using sensor data from a head mounted display that presents a mixed reality environment to recognize a gesture of a hand in the mixed reality environment and determine a first location for the hand at the time the hand was performing the gesture; establishing a virtual plane in the mixed reality environment, the virtual plane includes the first location and faces the head mounted display; using sensor data from the head mounted display to track movement of the hand and compare position of the hand in relation to the virtual plane and the first location; and panning the holographic map in response to tracked movement of the hand along the virtual plane, direction of panning of the holographic map is defined by directional orientation of the virtual plane such that other virtual planes with other directional orientations will establish different directions of panning the holographic map.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them. A connection includes an electrical connection or a mechanical connection, and can also include two materials in contact For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

We claim:

1. An apparatus for panning and zooming a holographic image, comprising:
   a sensor configured to receive sensor data associated with a gesture of a hand;
   a display system configured to display the holographic image in a mixed reality environment; and a processor in communication with the sensor and the display system, the processor is configured to:
recognize the gesture of the hand using the sensor data;
determine a first location of the hand at a time the hand was performing the gesture;
create a virtual plane in the mixed reality environment, the virtual plane includes the first location of the hand;
track a current position of the hand in the mixed reality environment using the sensor data;
project the current position of the hand to a projected position on the virtual plane;
determine a first distance from the first location of the recognized hand gesture on the virtual plane to the projected position on the virtual plane;
determine a second distance from the current position of the hand to the virtual plane;
compare the first distance to a first threshold and the second distance to a second threshold;
pan the holographic image in the mixed reality environment when the first distance is greater than or equal to the first threshold; and
zoom the holographic image in the mixed reality environment when the second distance is greater than or equal to the second threshold.

2. The apparatus of claim 1, wherein:
the virtual plane includes a virtual surface;
the processor is configured to dynamically determine a direction to orient the virtual plane based on the first location of the recognized hand gesture; gesture; and
the processor is configured to move the holographic image by projecting the current position of the hand to the projected position on the virtual surface and moving the holographic image based on the projected position.

3. The apparatus of claim 1, wherein:
the processor is configured to move the holographic image by projecting the current position of the hand to the projected position on the virtual plane and moving the holographic image in a panning direction that corresponds to a direction from the first location of the recognized hand gesture to the projected position on the virtual plane.

4. The apparatus of claim 1, wherein:
the processor is configured to move the holographic image by determining a distance from the hand to the virtual plane and zooming the holographic image at a speed based on the distance.

5. The apparatus of claim 1, further comprising:
a head mounted display device that comprises the sensor and the display system, the display system displays the holographic image that is visible through the head mounted display device;
wherein the processor is configured to create the virtual plane at the first location of the recognized hand gesture with the virtual plane facing the head mounted display device;
wherein the processor is configured to move the holographic image by panning the holographic image based on the projected position on the virtual plane, determining whether the hand is in front of or behind the virtual plane with respect to a person, and zooming the holographic image based on the determining.

6. The apparatus of claim 1, wherein:
the processor is configured to pan the holographic image in response to the gesture of the hand along the virtual plane, a direction of panning of the holographic image is defined by a first directional orientation of the virtual plane such that other virtual planes with other directional orientations will establish different directions of panning the holographic image; and
the processor is configured to zoom the holographic image in response to the second distance between the hand and the virtual plane, an orientation perspective of zooming of the holographic image is defined by a second directional orientation of the virtual plane such that other virtual planes with other directional orientations will establish different perspectives for zooming the holographic image.

7. The apparatus of claim 1, wherein:
the sensor is configured to sense positional information of the the the gesture of the hand in a real world environment; and
the processor is configured to create the virtual plane at the first location of the recognized gesture in the real world environment.

8. A method for panning and zooming a holographic image, comprising:
recognizing a gesture of a hand in a mixed reality environment;
receiving sensor data associated with the gesture of the hand;
displaying the holographic image in the mixed reality environment;
determining a first location of the hand at a time the hand was performing the gesture;
in response to recognizing the gesture, creating a virtual plane in a mixed reality environment, the virtual plane includes the first location of the hand;
tracking a current position of the hand in the mixed reality environment;
projecting the current position of the hand to a projected position on the virtual plane;
determining a first distance from the first location of the recognized hand gesture on the virtual plane to the projected position on the virtual plane;
determining a second distance from the current position of the hand to the virtual plane;
comparing the first distance to a first threshold and the second distance to a second threshold;
panning the holographic image in the mixed reality environment when the first distance is greater than or equal to the first threshold; and
zooming the holographic image in the mixed reality environment when the second distance is greater than or equal to the second threshold.

9. The method of claim 8, wherein
the creating the virtual plane facing a user comprises creating the virtual plane perpendicular to a line from the first location of the recognized hand gesture to a face of the user.

10. The method of claim 8, further comprising:
projecting a first portion of the holographic image on a real world surface that is smaller than an area of the entire holographic image such that a second portion of the holographic image is not displayed.

11. The method of claim 8, further comprising
panning the image in a panning direction corresponding to a direction from the first location of the recognized hand gesture to the projected position on the virtual plane;
determining whether the hand is in front of or behind the virtual plane; and
zooming the holographic image based on the determining.

12. The method of claim 11, further comprising
panning the holographic image with a panning speed based on the first distance;
zooming the holographic image at a zooming speed based on the second distance.

13. The method of claim 8, further comprising:
displaying the holographic image through a head mounted display device, the creating the virtual plane comprises creating the virtual plane facing the head mounted display device; and
displaying at least a portion of the virtual plane through the head mounted display device at the first location of the recognized hand gesture in a real world environment.

14. One or more non-transitory processor readable storage devices storing processor readable code for programming a processor to perform a method for navigating a holographic image, the method comprising:
recognizing a gesture of a hand in a mixed reality environments;
receiving sensor data associated with the gesture of the hand;
displaying the holographic image in the mixed reality environment;
determine a first location for the hand at a time the hand was performing the gesture;
establishing a virtual plane in the mixed reality environment, the virtual plane includes the first location;
tracking a current position of the hand in the mixed reality environment;
projecting the current position of the hand to a projected position on the virtual plane;
determining a first distance from the first location of the recognized hand gesture on the virtual plane to the projected position on the virtual plane;
determining a second distance from the current position of the hand to the virtual plane;
comparing the first distance to a first threshold and the second distance to a second threshold;
panning the holographic image in the mixed reality environment when the first distance is greater than or equal to the first threshold; and
zooming the holographic image in the mixed reality environment when the second distance is greater than or equal to the second threshold.

15. One or more non-transitory processor readable storage devices according to claim 14, wherein:
the processor readable code for programming the processor to pan the holographic image further comprises processor readable code for programming the processor to pan in a panning direction defined by a directional orientation of the virtual plane such that other virtual planes with other directional orientations will establish different directions of panning the holographic image; and
the processor readable code for programming the processor to pan the holographic image further comprises processor readable code for programming the processor to zoom an orientation perspective defined by the directional orientation of the virtual plane such that other virtual planes with other directional orientations will establish different orientation perspectives of zooming the holographic image.

* * * * *